United States Patent [19]

Russ et al.

[11] Patent Number: 4,604,683
[45] Date of Patent: Aug. 5, 1986

[54] COMMUNICATION CONTROLLER USING MULTIPORTED RANDOM ACCESS MEMORY

[75] Inventors: Roger R. Russ, Santa Barbara; Arthur C. Berggreen, Goleta, both of Calif.

[73] Assignee: Advanced Computer Communications, Santa Barbara, Calif.

[21] Appl. No.: 679,809

[22] Filed: Dec. 10, 1984

[51] Int. Cl.⁴ .................................. G06F 13/12
[52] U.S. Cl. ...................................... 364/200
[58] Field of Search ... 364/200 MS File, 900 MS File

[56] References Cited

U.S. PATENT DOCUMENTS

| 4,075,691 | 2/1978 | Davis et al. | 364/200 |
| 4,156,907 | 5/1979 | Rawlings et al. | 364/200 |
| 4,377,843 | 3/1983 | Garringer et al. | 364/200 |
| 4,399,503 | 8/1983 | Hawley | 364/200 |
| 4,456,957 | 6/1984 | Schieltz | 364/200 |
| 4,488,231 | 12/1984 | Yu et al. | 364/200 |

Primary Examiner—Thomas M. Heckler
Attorney, Agent, or Firm—Freilich, Hornbaker, Rosen & Fernandez

[57] ABSTRACT

A communication controller for facilitating bidirectional digital data transfers between a host processor and various types of networks. The controller architecture is characterized by multiple independent data transfer buses coupled to a central multiple port random access memory. The architecture avoids microprocessor bus contention in favor of RAM contention and thus enhances aggregate system throughput. Moreover, the buses are capable of performing operations concurrently to thereby further enhance system throughput.

16 Claims, 9 Drawing Figures

COMMUNICATION CONTROLLER USING MULTIPORTED RANDOM ACCESS MEMORY

BACKGROUND OF THE INVENTION

This invention relates generally to a communication control unit for facilitating bidirectional digital data transfers between a host processor and various types of communication networks and peripheral devices.

An increasing number of large multiuser data processing systems require the capability of bidirectionally transferring data at high rates between a host central processing unit ("host") and various types of communication networks and peripheral devices. Because the networks typically transmit data at very high rates and the host processor input/output (I/O) bus frequently exhibits relatively long latency times, the disparity adversely affects aggregate system throughput and may occasionally cause loss of network data when different devices contend for the same host internal data bus.

The present invention is directed to an improved communication control unit (controller), useful for front end protocol processing of data communicated between a host processor and a communications network. The controller is architecturally configured to enhance system thoughput by minimizing the aforementioned device contention.

DESCRIPTION OF THE PRIOR ART

The prior art is replete with various communication control devices intended to interface a host processor with various communication networks and peripheral devices. The following U.S. patents are exemplary of such devices:

U.S. Pat. No. 3,588,831
U.S. Pat. No. 3,702,462
U.S. Pat. No. 4,075,691
U.S. Pat. No. 4,079,452
U.S. Pat. No. 4,080,649
U.S. Pat. No. 4,156,906
U.S. Pat. No. 4,156,907

Although the aforelisted patents disclose front end protocol processing controllers intended for applications similar to the present invention, embodiments of the present invention differ significantly in architectural implementation in a manner which enables them to more effectively handle contention problems.

More particularly, a typical prior art communications controller includes a microprocessor having a single data bus defined by the pinouts of the microprocessor. All peripheral devices and/or communication channels are generally coupled to the single data bus which in typical operation can frequently become overloaded. The microprocessor data bus in such a controller architecture represents the limiting factor in the data throughput of the system.

SUMMARY OF THE INVENTION

The present invention is directed to an improved communication controller having an architecture characterized by a central multiport random access memory (RAM) and a microprocessor whose data transfer bus can be conceptually considered as segmented into multiple buses each connected to a different RAM port.

A controller organized in accordance with the present invention offers significant performance advantages over prior art approaches as a consequence of using multiple independant buses capable of performing operations concurrently and by shifting the traditional throughput limitation from microprocessor bus contention to RAM contention. RAM arbitration and RAM cycles are typically much faster than microprocessor bus arbitration and bus cycles and therefore throughput is considerably enhanced.

Embodiments of the present invention find particular utility as front end network attachments to host processors for performing protocal processing. However, they are also useful in other applications requiring high speed data transfer to a host processor.

In the preferred embodiment disclosed herein, it will be assumed that the controller utilizes a Motorola 68000 microprocessor and other identified commercially available components and that the host comprises a Digital Equipment Corporation PDP-11 having a UNIBUS as its I/O bus. It should be understood however that the invention is not restricted to any particular microprocessor or other component or host and that the teachings herein can be readily implemented using other equipment.

In the preferred embodiment of the invention, four separate and compatible data transfer buses are utilized respectively identified as bus segments CBUS, DBUS, UBUS and PBUS. Each bus segment is coupled to a different port of the central multiport RAM and couples a different set of devices thereto. Thus, the CBUS primarily couples the microprocessor and its local resources to RAM port 3. The DBUS couples a direct memory access controller and a data encryption processor and checksum generator to RAM port 2. The UBUS interfaces the host I/O bus, e.g. the PDP-11 UNIBUS, to RAM port 1. The PBUS couples communication networks or other peripheral devices to RAM port 0.

In accordance with an important aspect of the invention, the four bus segments can function independently of one another, thus allowing bus cycles on one bus to occur independently of cycles on any other bus. Additionally, the RAM (i.e. memory array and related memory control logic) includes means for isolating the bus segments so that bus cycles occur independently of memory array cycles.

In accordance with a further aspect of the invention, the RAM includes arbitration logic to establish priority between bus segments competing for control of the RAM memory bus.

In accordance with a significant feature of the preferred embodiment, microprocessor controlled bus interface circuits are provided to selectively connect or disconnect from one another, depending on the type of activity currently being executed.

DESCRIPTION OF THE PREFERRED ENBODIMENT

OVERVIEW

The preferred embodiment of the invention to be disclosed herein comprises a communication controller for functioning as a network front end attachment to the I/O bus (UNIBUS) of a Digital Equipment Corporation PDP-11 processor. The controller is preferably implemented on a single circuit board which may hereinafter sometimes be referred to as the Unibus Processor Board (UPB). In describing the details of the UPB, reference will sometimes be made to specific commercially available components such as the Motorola 68000 microprocessor and related devices. Despite such references, it should be understood that the present invention is not restricted to any particular components or host processor. Rather, embodiments based on the principles of the invention can be implemented with a variety of commercially available components for interfacing with a variety of host processors.

Figure 1:
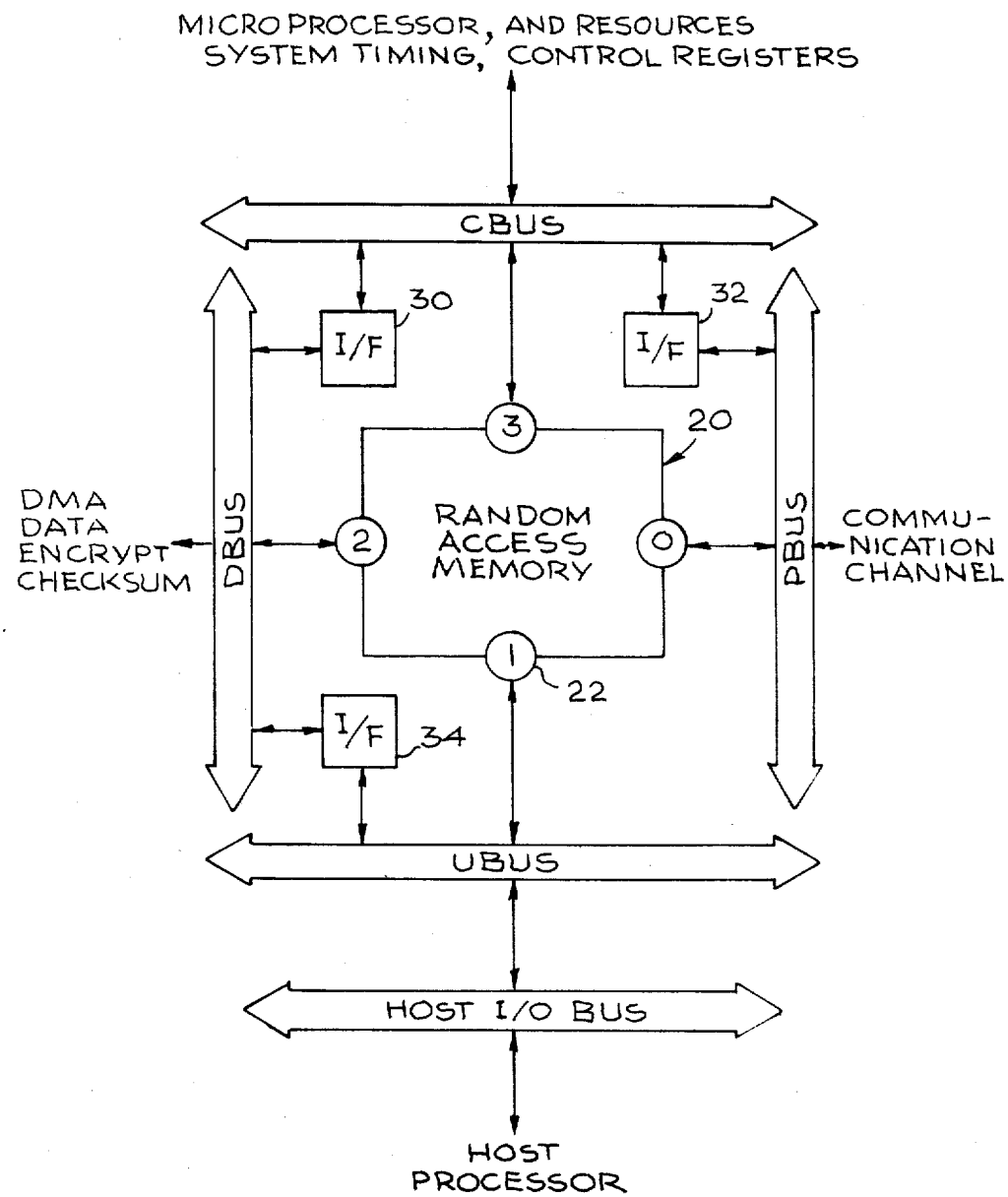
FIG. 1 schematically depicts the architecture of a communication controller in accordance with the present invention.

Attention is initially directed to FIG. 1 which schematically depicts the architecture of a controller in accordance with the present invention. The architecture is characterized by a central random access memory (RAM) 20 having multiple input/output ports 22. FIG. 1 depicts four such ports 22 respectively identified as ports 0, 1, 2, and 3. FIG. 1 further depicts four separate buses respectively identified as the PBUS, UBUS, DBUS, and CBUS. These buses should conceptually be considered as segments of a single microprocessor data transfer bus and will hereinafter frequently be referred to as bus segments.

Each bus segment corresponds to a conventional microprocessor data transfer bus and should be understood to include address, data and control lines. Each bus segment interfaces to a different group of components. Thus, the PBUS primarily interfaces to communication networks, the UBUS interfaces to the UNIBUS, the DBUS to direct memory access and data encryption means and the CBUS to the microprocessor and its local resources, and to system timing means and control registers. These four bus segments are respectively connected to the RAM input/output ports 0, 1, 2, and 3 for bidirectional data transfer.

FIG. 1 additionally depicts interface circuit 30 for selectively directly connecting the CBUS and DBUS segments. Similarly, interface circuit 32 selectively connects the CBUS and PBUS segments and interface circuit 34 selectively connects the UBUS and DBUS segments. As will be discussed hereinafter, the interface circuits 30, 32, and 34 primarily operate under the control of a microprocessor attached to the CBUS.

It has been pointed out that conventional microprocessor based communication controllers employ a single microprocessor data transfer bus to which all peripheral devices and networks are attached. This conventional architecture makes the microprocessor data transfer bus the limiting factor in the aggregate bandwith of execution and data throughput. In contrast, the controller architecture depicted in FIG. 1 functions to shift the throughput limitation from microprocessor bus contention to RAM contention. Since RAM arbitration and RAM cycles are typically much faster than microprocessor bus arbitration and bus cycles, the architecture depicted in FIG. 1 offers a distinct throughput improvement over conventional controllers. Moreover, the reduced necessity to connect and disconnect bus segments, in the preferred embodiment, improves overall performance. As will be seen hereinafter, each bus segment contains means that can generate bus cycles. When these cycles do not require resources attached to other bus segments, the cycles can proceed independently. In other words, the bus segments can function independently of each other, and also independently of the cycles of the random access memory 20. As a nonlimiting example, the microprocessor unit connected to the CBUS can fetch an instruction from a read only memory also connected to the CBUS while the direct memory access controller coupled to the DBUS is writing a word into a data encryption device also coupled to the DBUS. Concurrently, a second direct memory access controller coupled to the PBUS can write a word into the central random access memory while a UNIBUS slave cycle takes place on the UBUS.

CONTROLLER BLOCK DIAGRAM—FIG. 2

Figure 2:
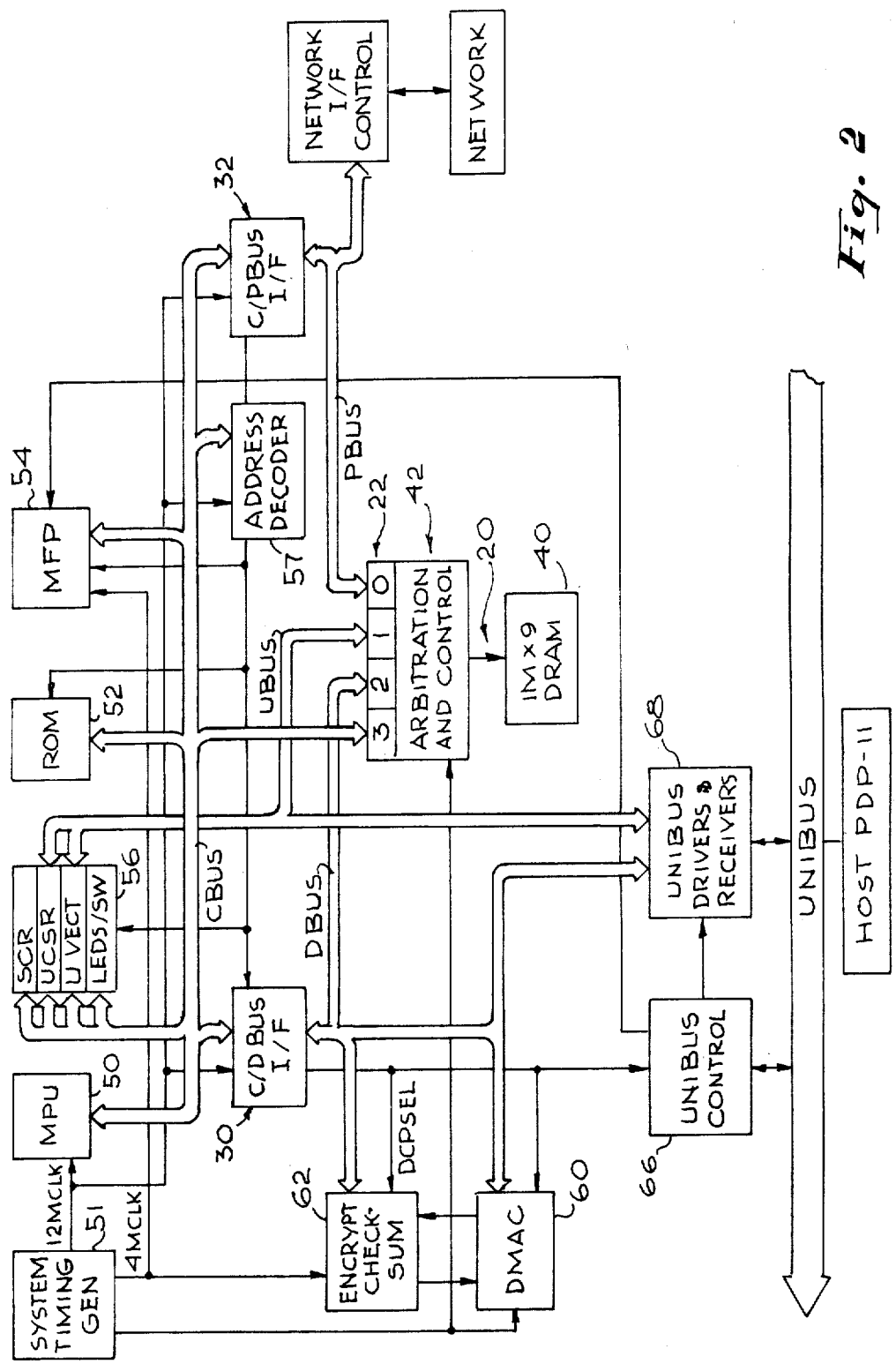
FIG. 2 is a block diagram of a preferred embodiment of a controller in accordance with the present invention.

Attention is now directed to FIG. 2 which illustrates a block diagram of a preferred embodiment of the controller in accordance with the invention showing the RAM 20 and bus segments PBUS, UBUS, DBUS, and CBUS. As shown, random access memory 20 comprises a one megabyte dynamic RAM array (DRAM) 40; i.e. one M×9 bits with parity. Connected to the DRAM 40 is arbitration and control block 42 defining the ports 0, 1, 2, and 3 previously referred to.

Consistent with the illustration in FIG. 1, the PBUS is connected to port 0 of the arbitration and control block 42. Similarly, the UBUS, DBUS, and CBUS are respectively connected to ports 1, 2, and 3. As will be discussed hereinafter, the arbitration and control logic 42 is configured to define memory priority levels amongst the ports 22; from highest priority for port 0 to lowest priority for port 3.

The components coupled to each of the PBUS, UBUS, DBUS, and CBUS will be discussed separately hereinafter in connection with FIGS. 5-9. However, in order to better understand the overall organization of the block diagram of FIG. 2, the general function of each bus segment will be introduced here.

Connected to the CBUS is the microprocessor unit (MPU) 50 and a system timing generator 51 which controls the overall functioning of the UPB depicted in FIG. 2. Also connected to the CBUS are the microprocessor local resources including, for example, read only memory (ROM) 52 which stores program and parameter storage. A multifunction peripheral (MFP) device 54 is also connected to the CBUS and is used to generate timing signals and interrupts for devices without vector capability. Additionally, a set of control registers 56 is also connected to the CBUS. These registers are used to control various functions within the UPB. Further, address decoder 57 is connected to the CBUS for primary address decoding.

The devices primarily connected to the DBUS include a direct memory access controller (DMAC) 60 and a data encryption and checksum processor 62.

The UBUS connects to the interface to the UNIBUS including the UNIBUS control logic 66 and the UNIBUS drivers and receivers 68. Additionally, as shown, the UBUS is connected to two of the aforementioned control registers 56.

The PBUS connects to devices that may differ depending upon the particular type or communication channel being interfaced to the host processor; e.g. whether the channel is a high speed serial channel or a local area network (LAN) such as Ethernet. These different implementations will be discussed in connection with FIGS. 8 and 9.

It is pointed out that various signal lines in FIG. 2, as well as the subsequent figures, are labeled with signal names. Appendix A hereto defines each of these signal names.

It should be understood that the novel aspects of the invention reside primarily in the organization of the controller characterized by the use of multiple independent buses each having access to a multiported RAM. The components attached to the buses, as depicted in FIG. 2, are all well known devices and accordingly will not be discussed in detail herein. Appendix B hereto identifies various documents which disclose the devices of the preferred embodiment and their interfaces in great detail.

Appendix C hereto defines a preferred addressing scheme (or memory mapping) for the embodiment of FIG. 2 when using a 68000 microprocessor 50. As is well known, the 68000 bus format provides for a twenty four bit address defining a sixteen megabyte range. The four most significant address bits are used to divide the full range into sixteen one megabyte blocks. Appendix C, sheet 1 depicts the primary decoding for addresses supplied to CBUS by MPU 50. Sheets 2 and 3 respectively depict the secondary decoding for addresses supplied to DBUS and PBUS by the MPU or DMA devices coupled thereto. Secondary decoding on these buses is necessary to permit data transfers with local resources independently of activity on the CBUS.

RANDOM ACCESS MEMORY—FIG. 3

Figure 3:
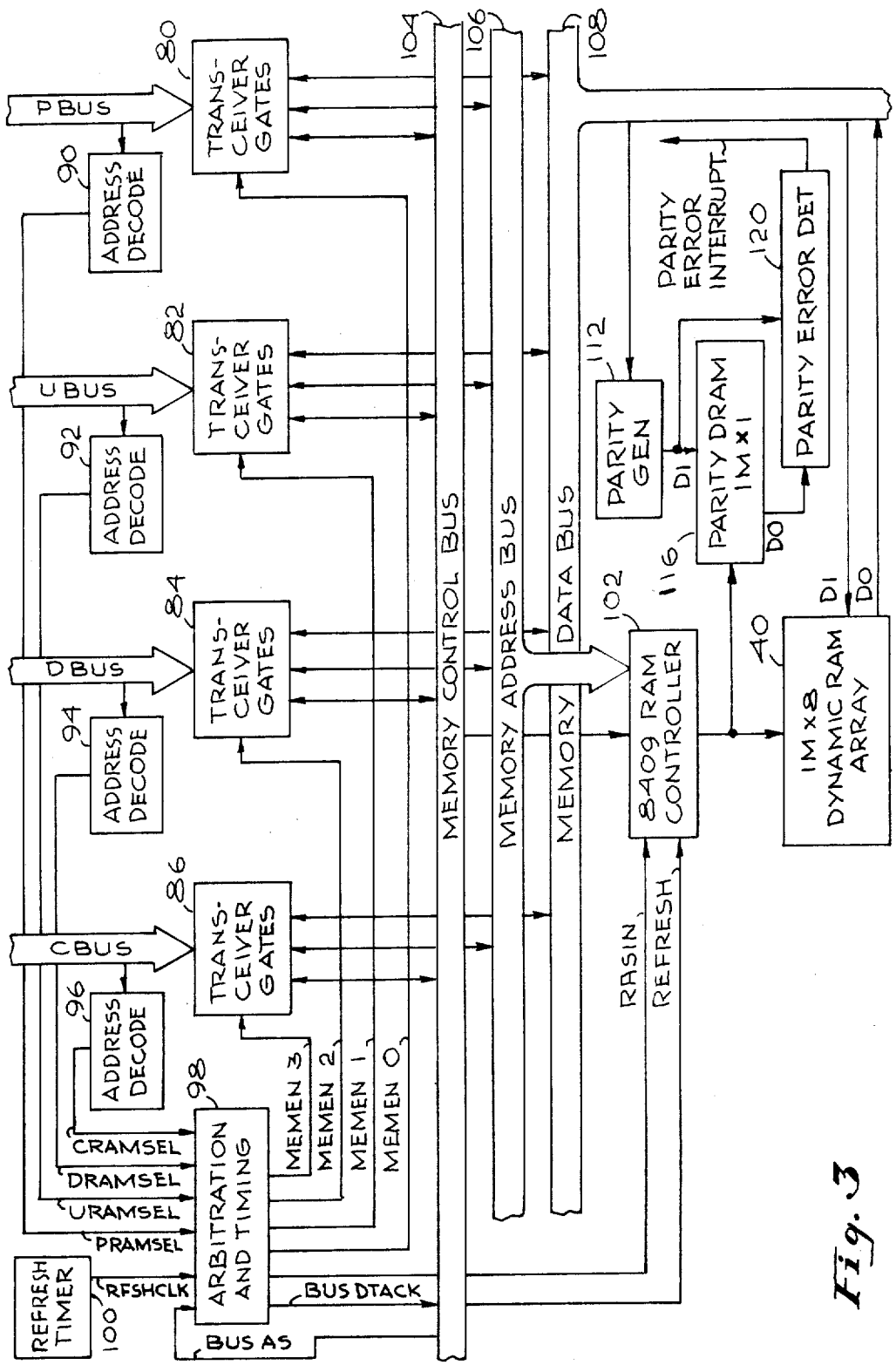
FIG. 3 is a block diagram of the random access memory utilized in the embodiment of FIG. 2.

Attention is now directed to FIG. 3 which illustrates the random access memory 20 in greater detail. Initially, it should be noted that the data bus segments DBUS, UBUS, DBUS, and CBUS enter from the top of FIG. 3, respectively terminating in transceiver gates (TG) 80, 82, 84, and 86. As aforementioned, the devices connected to the various bus segments will be described in detail hereinafter in connection with the ensuing figures but suffice it to say at this point that each bus segment supplies control, address, and data information to the RAM memory bus, via an enabled transceiver gate, each time a data byte or word is written into or read from RAM. The transceiver gates function to isolate the bus segments from the RAM array so that the bus cycle timing can be independent of the memory cycle timing of the RAM array. Moreover, the bus segments operate independently with respect to one another.

Address decoders 90, 92, 94, and 96 are respectively coupled to the bus segments, each to generate a memory select signal (e.g. CRAMSEL) when the memory address supplied by the bus segment lies within its defined range. The select signals generated by the address decoders go to the arbitration and timing logic 98 which is part of the aforementioned arbitration and control block 42. The arbitration and timing logic 98 establishes priority amongst concurrent memory calls by multiple bus segments. As aforementioned, the priority order from the highest to lowest is: PBUS, UBUS, DBUS, and CBUS.

Since it has been assumed in the preferred embodiment that the RAM array is comprised of dynamic RAM circuits, it is necessary to periodically supply a refresh pulse to the array. Accordingly, a refresh timer 100 is provided which periodically supplies a refresh clock signal (i.e. RFSHCLK) to the arbitration and timing logic 98. The refresh clock signal is treated as the highest priority port and is always given the next RAM cycle. The address for the refresh cycle is supplied by a dynamic RAM controller 102.

The arbitration and timing logic 98 determines the highest priority request amongst the bus select signals and supplies a memory enable signal (e.g.MEMEN3) to the transceiver gate (e.g.86) associated with that bus request. Simultaneously, a row/address strobe signal (RASIN) is sent to the RAM controller 102 to initiate a memory cycle. This couples the selected bus transceiver gate to the memory bus structure, comprised of memory control bus 104, memory address bus 106 and memory data bus 108. The control signals supplied to the memory control bus 104 provide address timing, data timing, byte control, and read/write control. The address information supplied to the memory address bus 106 are time multiplexed into row and column addresses by the RAM controller 102 which also provides the timing and generation of the row and column address strobes. The memory data bus 108 is coupled directly to the RAM array 40.

The RAM array 40 is assumed to have a 1 megabyte capacity and is preferably comprised of two separately addressable banks (not shown) with each bank storing words of two bytes. Bank select is determined by a single bit within the memory address thus allowing controllers to be readily implemented using either one or two memory banks. Data transfers with RAM can be either byte length or full word length.

In addition to being coupled to the RAM array 40, the memory data bus 108 is also coupled to a parity generator 112. Control bits in the system configuration register (SCR), i.e. one of the aforementioned control registers 56 (FIG. 2), allow parity to be odd or even, generated or inhibited, and detected or masked. During a memory write cycle, parity is calculated and stored in a parity array 116. This array has the same control signals as the main array 40. During a read cycle parity is generated from the read data of the main array and then compared to the bit stored in the parity array 116. If an error is detected, and if parity detection is enabled, a nonmaskable parity error interrupt is generated by the parity error detector 120.

The RAM 20 is preferably organized so that it can be accessed as either byte length or word length items as defined by data strobes supplied by microprocessor 50. Additionally, the RAM is organized into upper and lower halves which can be selectively addressed by strobes derived from address bits.

DATA BUS SEGMENT INTERFACE—FIG. 4

Figure 4:
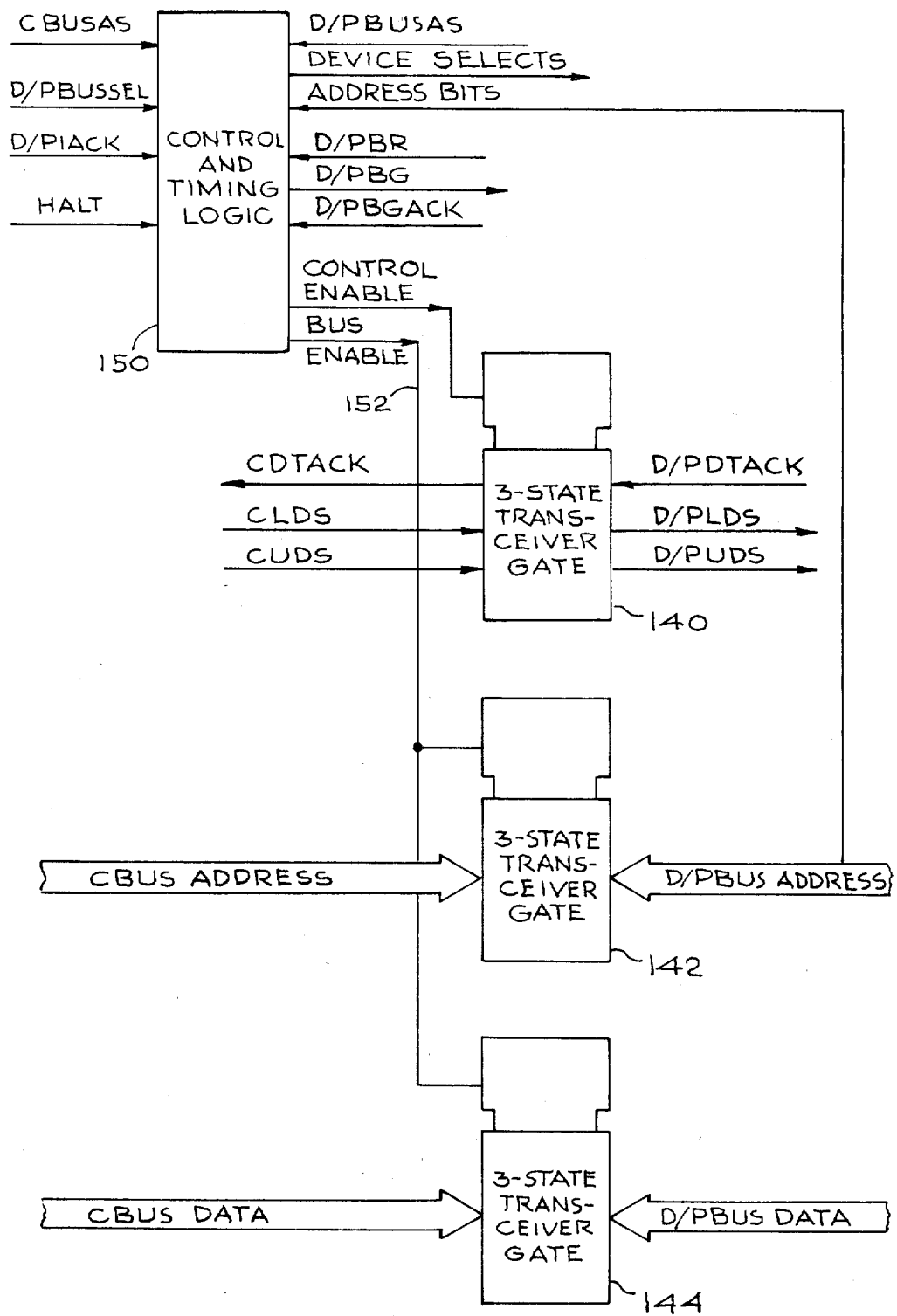
FIG. 4 is a block diagram of the bus interface logic depicted in FIG. 2.

The overall scheme of segmenting the microprocessor data transfer bus is depicted in FIG. 1 which illustrates three bus interface modules 30, 32, and 34 for respectively coupling CBUS and DBUS, CBUS and PBUS, and DBUS and UBUS. FIG. 4 comprises a block diagram of identical interface modules 30 and 32 for connecting the CBUS to either the DBUS or PBUS.

It should be noted that signals applicable to either the DBUS or PBUS are labeled "D/PBUS" in FIG. 4. Interface module 34 is conceptually the same as modules 30,32 but differs in some minor implementation details (not shown). The differences exist because the UNIBUS interface is closely related to the DBUS-/UBUS interface. It is thus assumed in FIG. 2 that the interface module 34 is contained within the UNIBUS driver and receiver block 68.

With continuing reference to FIG. 4 bus interface module 30 includes three state transceiver gates 140, 142, and 144 which respectively isolate control, address, and data information. Each of the three state gates can define an "on-connecting" state or an "off-disconnecting" state or a "disabled" state. Control logic 150 arbitrates bus activity for the DBUS or PBUS bus segments. Address bits are monitored so that the control logic 150 can generate device selects from the current bus address. Bus cycles independent of the microprocessor 50 will proceed until an event occurs that requires direct bus connection via an interface module. Two general types of microprocessor 50 events can occur to cause the three state gates 140, 142, 144 to switch to an on-connect state; i.e. (1) a device reference or (2) and interrupt acknowledge.

During a device reference event, the source bus segment (i.e.CBUS) generates a bus select signal (D/PBUSSEL) as a consequence of primary decoding on the CBUS by decoder 57 (FIG. 2). The memory map is preferably arranged so that all devices on a bus segment can be decoded with a minimum number of address bits. The control logic 150 monitors the activity on the destination bus segment, and when a bus cycle is available, a bus enable signal 152 is generated to couple the CBUS address and data signals onto the destination bus segment (DBUS or PBUS). Further address decoding is done on the destination bus segment to differentiate specific devices connected thereto.

The second microprocessor event to switch gates 140, 142, 144 to an on-connect state occurs in response to interrupt requests of devices on bus segments which are honored by the microprocessor. During an interrupt acknowledge operation, bus connection is required. The interrupt acknowledge signal (D/PIACK) is received by the control logic 150 and generates the bus enable signal on line 152. After any pending bus activity is completed, the gates 140, 142 and 144 then connect the CBUS to the DBUS or PBUS to allow the microprocessor interrupt protocol to take place.

CBUS COMPONENTS—FIG. 5

Figure 5:
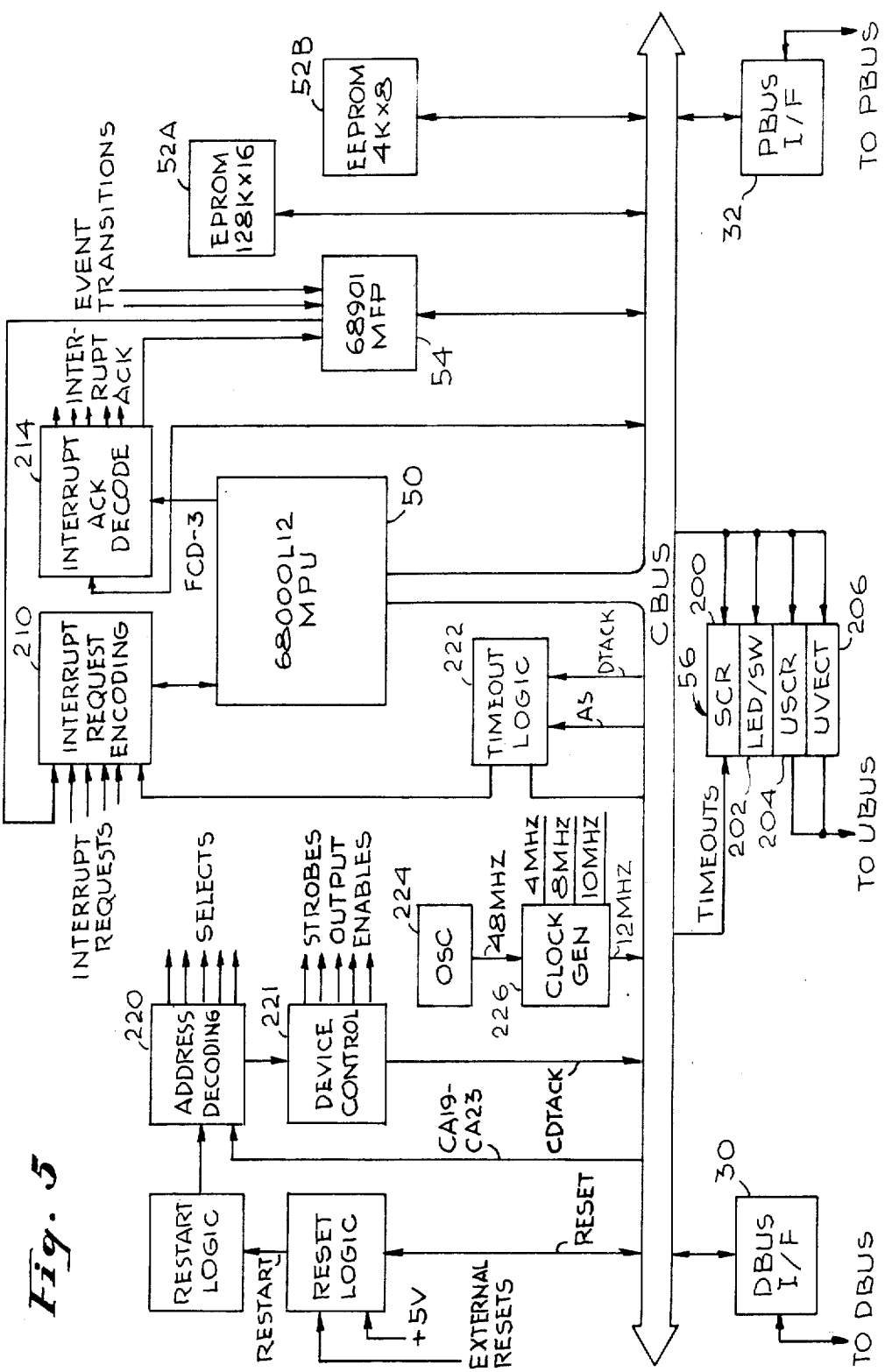
FIG. 5 is a block diagram depicting the CBUS components.

Attention is now directed for FIG. 5 which illustrates the organization of the CBUS and its components in greater detail than was depicted in FIG. 2. The CBUS can be considered the primary bus of the controller as it contains the aforementioned microprocessor (MPU) 50. Aside from the microprocessor 50 the primary functional elements associated with the CBUS are the aforementioned multifunction peripheral unit 54 an electrically programmable read only memory (EPROM) 52A and an erasable electrically programmable read only memory (EEPROM) 52B. Additionally connected to the CBUS are the aforementioned control registers 56 including the system configuration register (SCR) 200, the LED switch register (LED/SW) 202, the UNIBUS control and status register (UCSR) 204, and the UNIBUS vector register (UVECT) 206.

As aforementioned, the microprocessor 50 is the main processing element of the controller and it defines the microprocessor bus. Although the other bus segments may operate independently of the CBUS, all bus segments are dependent upon the CBUS for origination of some control. Interrupt servicing and program execution typically occur on the CBUS in response to programs stored in PROMS 52A and 52B or alternatively stored in RAM 20. Also, it should be understood that the microprocessor 50 is the primary factor determining bus connections. Whenever the microprocessor 50 references a device not on the CBUS, a connection between bus segments must be established by one of the interface modules 30,32,34.

It should be understood that the UPB constitutes an intelligent communication controller that contains firmware primarily resident in PROM 52A defining the communication protocol rules necessary to process the digital data supplied by the host processor via UBUS or the communication channel via PBUS. PROM 52B primarily functions to store protocol configuration parameters that are infrequently altered in a particular environment. Alternatively, protocol rules and/or configuration parameters can be loaded into RAM 20 from the host or network.

The function of the multifunction peripheral (MFP) 54 is primarily to perform timer functions and to generate interrupts for devices without vectored interrupt capability. The MFP 54 comprises a Motorola 68901 containing four counter timer channels (not shown) that may be programmed to run independently or in pairs. The channels can count at different rates, time events, count events, or provide timer interrupts for various software events. The MFP 54 also contains a parallel port for monitoring transitions on each bit and this capability is used to detect specific events generated by devices that do not have vectored interrupt capability. The MFP is directly wired to these events (not shown) and programmed to generate a vectored interrupt when the event makes a transition to an active state.

The interrupt requests of the MFP 54, along with all other interrupt requests goes to a centralized encoding module 210. All requests are assigned a priority level and the highest priority level is posted to the microprocessor 50. If the request level is higher than the state of the interrupt mask bits currently in the microprocessor, the microprocessor 50 responds with function code bits indicating an interrupt acknowledge. The priority level is encoded in the three least significant address bits. Decoding logic 214 determines the interrupting device from this information and sends an interrupt acknowledge to the device. The interrupt cycle then completes according to conventional microprocessor bus rules.

The centralization of the interrupt logic utilizing the encoding and decoding blocks 210 and 214 is typical of how most control functions are implemented on the UPB. Many control functions are located on the CBUS resulting in fewer required circuits and minimizing the necessity of frequent interbus connections. Besides the interrupt function handled in the aforedescribed manner by the encoding and decoding circuits 210 and 214, address decoding, device strobes and device output enables, are similarly handled by address decoder 220 and device control unit 221. Bus timeout logic is similarly handled by timeout logic 222.

Logic related to the control registers 56 is also connected to the CBUS. The function of the system configuration register 200 is to contol the generation and detection of RAM parity, bus timeouts, memory mapping, Unibus byte ordering, and other status information. The LED/SW register 202 provides a means of operator input and output. The UCSR 204 controls interaction with the UNIBUS, principally DMA and interrupt capability. The UVECT register 206 contains a programmable UNIBUS interrupt vector.

Additionally, the basic system timing generator 51 is depicted as including oscillator 224 and clock generator 226 connected to the CBUS. In fact, these devices provide the clock signals used by all bus segments.

DBUS COMPONENTS—FIG. 6

Figure 6:
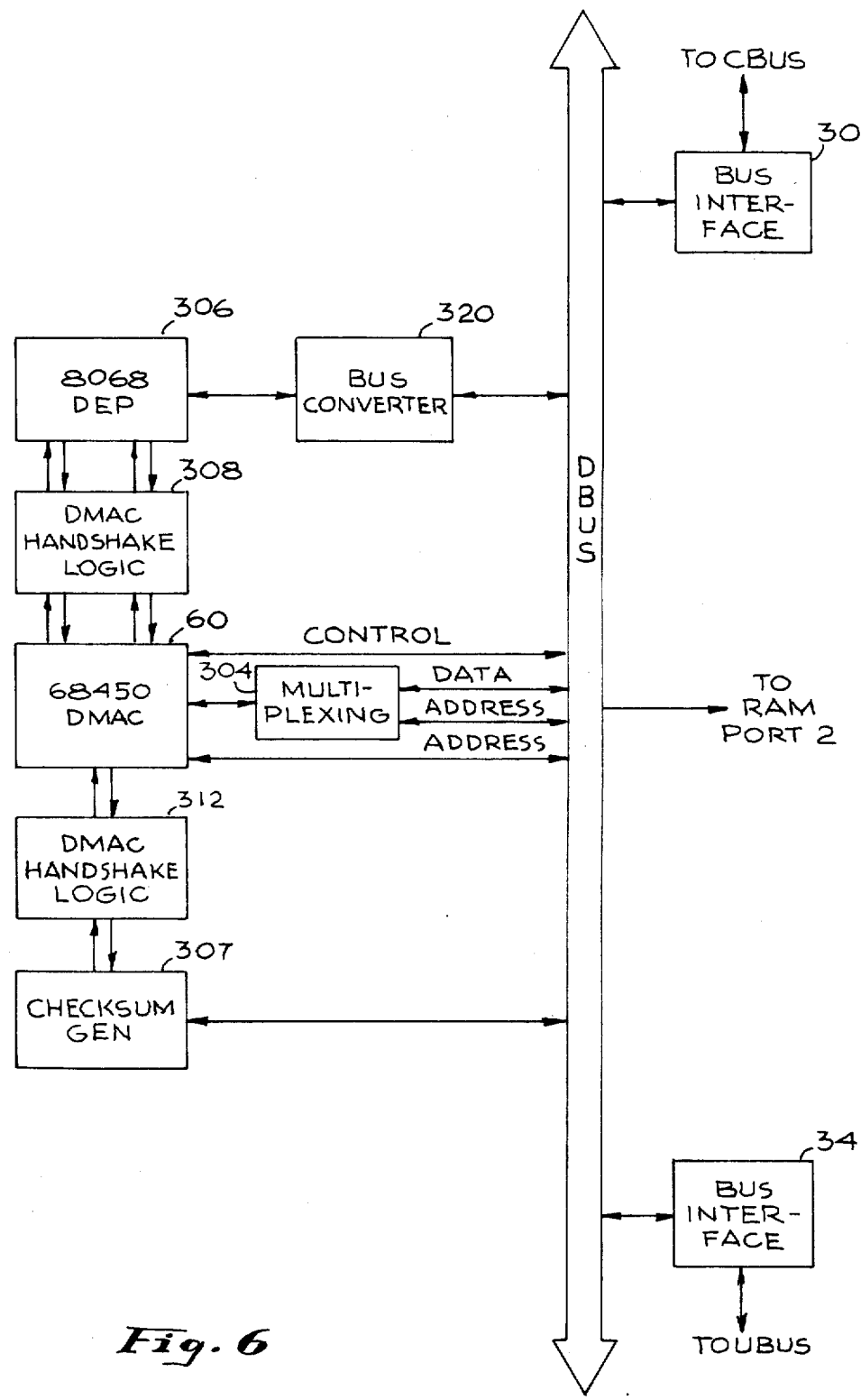
FIG. 6 is a block diagram depicting the DBUS components.

Attention is now directed to FIG. 6 which illustrates the DBUS and the components directly connected thereto. The main function of the DBUS is to provide independent direct memory access (DMA) to the RAM so that data can be transferred through the UPB with a minimum of microprocessor interruption. The three main functions of the DBUS components are to (1) transfer data to and from the UNIBUS, via the UBUS, (2) calculate checksums on data blocks, and (3) encrypt and decrypt data blocks.

The main components attached to the DBUS in FIG. 2 are the aforementioned DMA controller (DMAC) 60 and data encrypt and checksum processor 62. FIG. 6 depicts processor 62 as separately comprising a data encrypt processor (DEP) 306 and a checksum generator 307. The DMAC 60 preferably comprises a Motorola 68450 which is a four channel device operating under internal program control. The DMAC 60 functions like most DMA controllers in that it can transfer data from a source to a destination by supplying the address in two consecutive bus cycles, storing the data internally between the cycles. In addition to this mode, the DMAC 60 can transfer data between a peripheral device and RAM in a single cycle. For this purpose, the peripheral device should include some form of conventional handshake logic. This operation is accomplished by first supplying the memory address and then supplying a handshake signal to the peripheral device when the memory provides the addressed data.

As is depicted in FIG. 6, the DMAC 60 is directly attached to the DBUS with the exception that the data bits are time multiplexed in multiplexor 304 with sixteen of the address bits. When the DMAC does memory to memory moves this data path is used. Since the UNIBUS is memory mapped within the UPB address range, UNIBUS DMA can be originated by the DMAC 60 by simply doing memory moves within the UNIBUS address range.

The DMAC 60 has three channels wired to peripherals on the DBUS. Two channels are attached by handshake logic 308 to the aforementioned data encryption processor (DEP) 306. The third channel is attached by a handshake logic 312 to the aforementioned checksum generator 307. This configuration allows the DMAC to use the more efficient single address mode when encrypting or calculating checksums.

As depicted in the preferred embodiment in FIG. 6, the DEP 62 comprises an Advanced Micro Devices 8068 device and is thus not Motorola 68000 bus compatible. Bus converter logic, preferably a programmable logic array (PLA), 320 makes the translation between 68000 bus protocol and that required by the DEP 62. The checksum generator 314, also preferrably a programmable logic array, calculates the checksum required by different communication protocols. Since this operation is conventionally accomplished by the microprocessor under software control, considerable execution time is saved by providing the special purpose checksum generator 314.

UBUS COMPONENTS—FIG. 7

Figure 7:
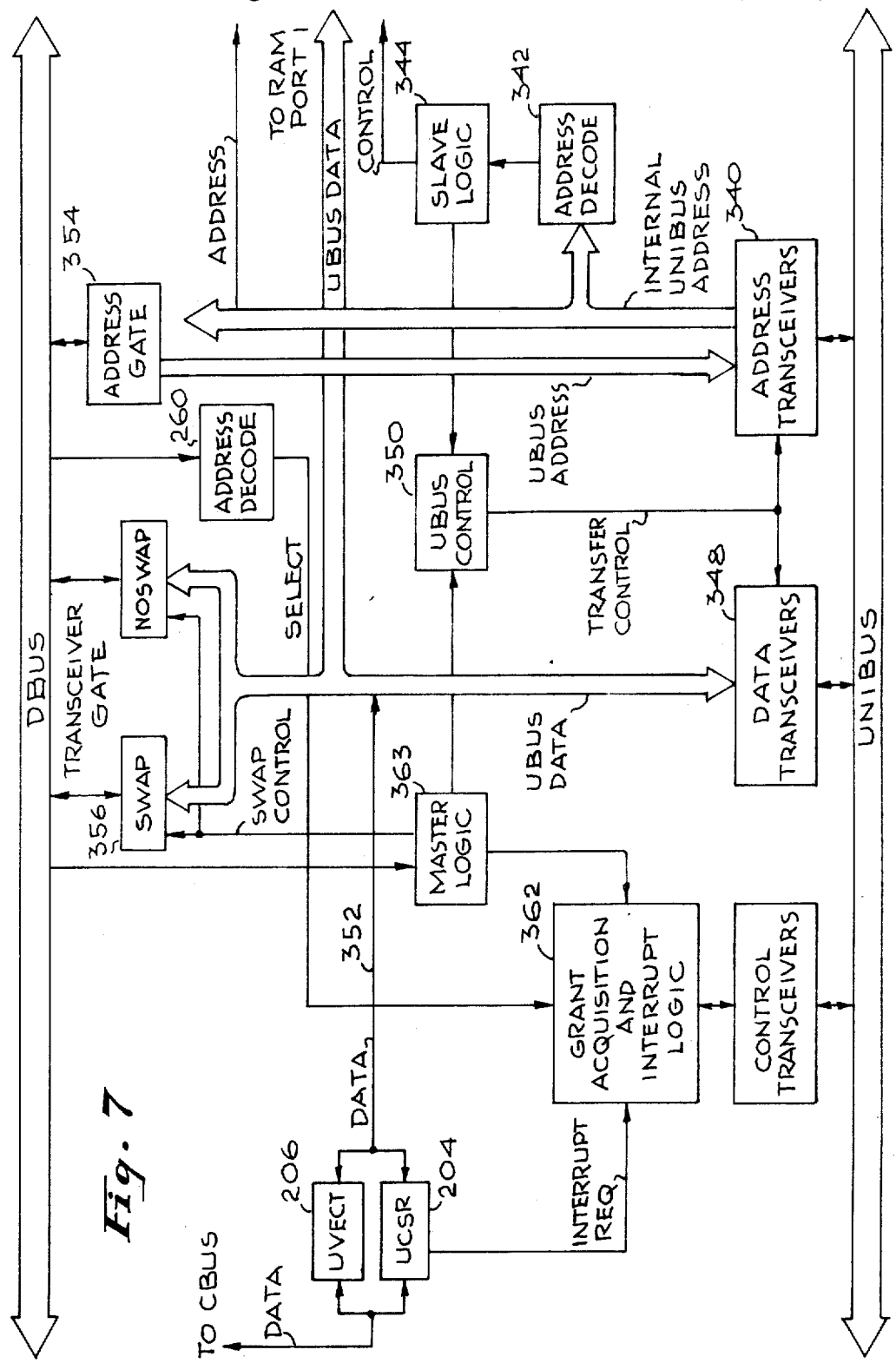
FIG. 7 is a block diagram depicting the UBUS components.

Attention is now directed to FIG. 7 which depicts the components primarily associated with the UBUS which functions primarily to provide a data path when the UPB is performing UNIBUS cycles. As the interface to the UNIBUS, the UPB operates in accordance with three types of cycles; i.e. slave cycles, master cycles and interrupt cycles, as defined by DEC UNIBUS documentation (Appendix B). As a slave, the UPB occupies sixteen words in the UNIBUS I/O space. These sixteen words are the Communication Registers which both the 68000 CPU and the UNIBUS processor can access in order to exchange information. The first register in the group is the UNIBUS Control and Status Register 204. This register provides interrupt capability and some hardware functions. It is accessible by both the UNIBUS and UPB. The other fifteen registers are actually in dynamic RAM 201, and are accessed by the UNIBUS through the UBUS and RAM Port 1.

The UNIBUS address tramceovers 340 continually monitor the UNIBUS address lines, as depicted in FIG. 7. When the address decoding logic 342 recognizes the unique slave interface address, a select signal is sent to the slave cycle control logic 344. When the UBUS is free, the data tranceivers 348 will be enabled and a RAM request made. The RAM cycle takes place according to the control information supplied by the UNIBUS to the UBUS control logic 350. If the address supplied by the UNIBUS identifies the UCSR communication register 204, a data transfer occurs, via line 352.

A master cycle is always initiated through the DBUS. The source of the master cycle may be either the microprocessor 50, via the DBUS, or the DBUS DMAC 60. When the address decoder 360 recognizes a DBUS address identifying a UNIBUS transfer, it sends a select signal to the UNIBUS acquisition logic 362. When a grant is received, the UBUS control logic 350 enables the DBUS address gate 354 and data transceiver gates 356 and then the UNIBUS tranceivers 340, 348. One of the two sets of DBUS data transceiver gates 356 is enabled by master logic 363 according to information stored in the system configuration register two sets (i.e. "SWAP" and "NO SWAP") of gates 356 are used to a choice of byte ordering, under program control to accomodate different byte numbering formats used by microprocessor 50 and the UNIBUS.

Interrupts are generated by request bits in the UNIBUS control and status register 204 which enable the UNIBUS acquisition logic 362. When a grant is obtained, the contents of the UVECT register 206 will be enabled onto the UNIBUS. Since the UVECT register is writable by the CBUS, the microprocessor 50 is able to determine the vector.

PBUS—FIGS. 8,9

Figure 8:
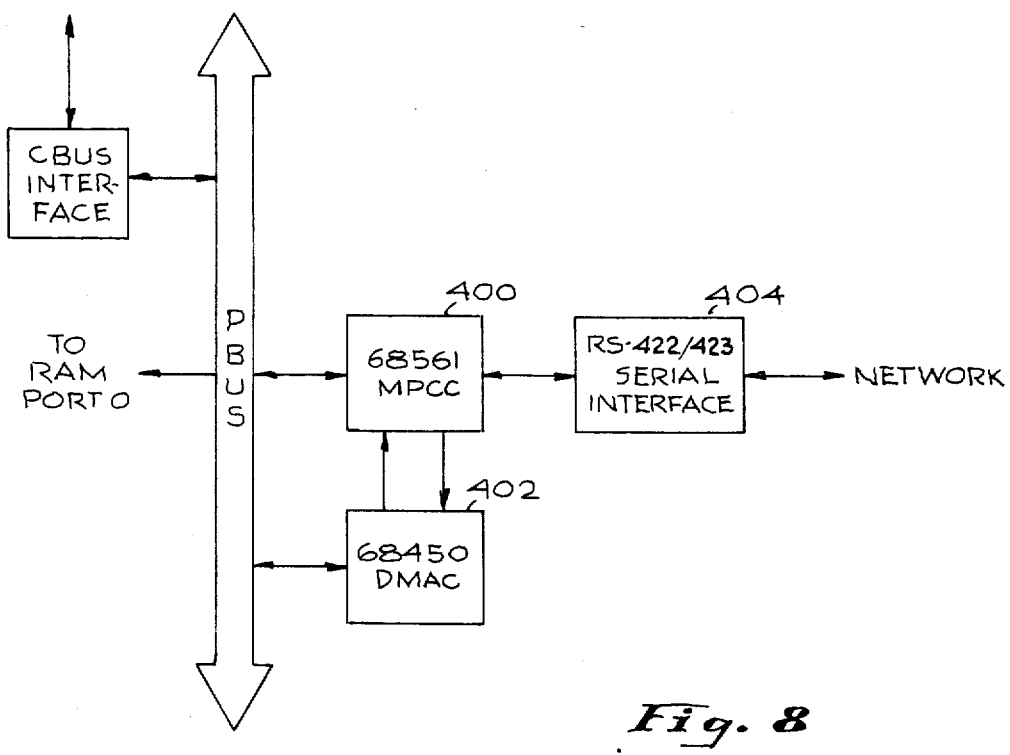
FIG. 8 is a block diagram depicting an arrangement of PBUS components for coupling a high speed serial channel to a host processor.

The components connected to the PBUS will differ depending upon the type of communication network with which the controller is intended to operate. For example, FIG. 8 illustrates the PBUS components for interfacing a high speed serial input/output network to the host processor. For this application, the PBUS components include a network controller 400, depicted as a multiprotocol communication controller (MPCC). The function of the controller 400 is to provide control signals, network data, and the appropriate interface to the microprocessor 68000 bus. If the controller 400 does not have direct memory access capability, a separate DMA controller 402 is added. DMA controller 402 preferably has multichannel capability to allow sequential accessing without requiring MPU intervention. Additionally, for high serial input/output channels, a serial interface device 404 comprised of serial line drivers and receivers operating at the specified clock rate is utilized. The PBUS is allocated the highest priority RAM port because the network coupled thereto may have a very high data rate.

Figure 9:
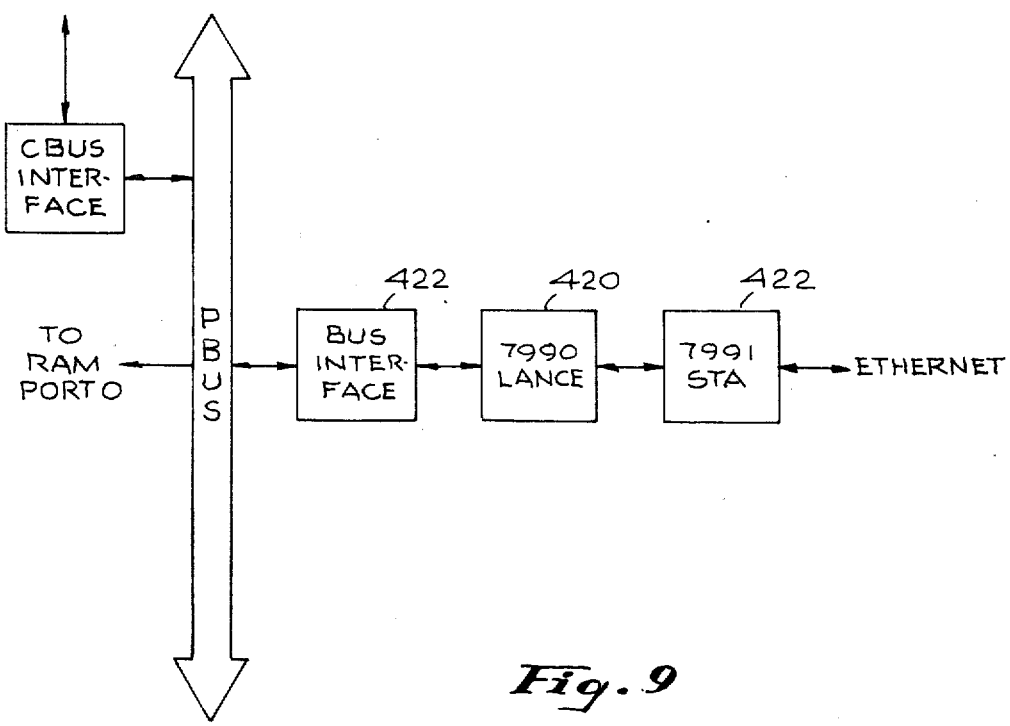
FIG. 9 is a block diagram depicting an alternative arrangement of PBUS components for coupling a local area network to a host processor.

FIG. 9 illustrates an alternative arrangement of PBUS components for interfacing a local area network, such as Ethernet to the host. In this case, a special Ethernet controller 420, typically containing its own direct memory access capability, is utilized. A special bus interface 422 is typically required because the Ethernet controller 420 is typically not microprocessor 68000 compatible. The actual interface to the Ethernet is provided by serial interface adaptor 424.

SYSTEM OPERATION

From the foregoing, it should now be understood that data flows through the UPB either from the host to the network or from the network to the host. In order to better understand the role of the UPB in transferring data, a typical operational sequence will now be described.

An operation will begin with the host storing block transfer parameters in the aforementioned software communication registers. Additionally, the host will set a bit in the hardware UNIBUS control and status register (UCSR). This bit causes an interrupt via the MFP 54. The microprocessor 50 is thus interrupted and caused to examine the communication registers. Based on the parameters stored in the communications registers, the UPB then prepares to transfer a block of data from UNIBUS memory to RAM 20. Transfer parameters typically include starting address, block length, and other controller status information.

Preparation for the transfer is begun by initializing the DBUS DMAC 60 with appropriate parameters. The DMAC 60 then executes dual address memory to memory moves that involve a read of the UNIBUS via the UBUS and then a write to RAM via the DBUS port. This proceeds until the last data element in the block has been transferred. The DMAC 60 then interrupts the microprocessor 50 to inform it that the transfer is complete. At this point, the microprocessor may interrupt the host processor through the UCSR to inform the host that the data block has been transferred.

After the data block has been transferred to RAM, the following operations are application dependent. Some form of protocol processing typically takes place in accordance with a program stored in either EPROM 52A or RAM. This may involve rebuffering the data via a DMAC, reformatting the data block, or appending a header. Some of the processing may involve specific UPB peripheral components.

For example, if a checksum needs to be appended, a DBUS DMAC channel will be initialized to write the block from RAM into the checksum generator 307 (FIG. 6). The checksum generator will perform the calculation and the DMAC 60 will interrupt the microprocessor 50 at the end of the block. The interrupt routine will read the result and append the checksum to the data block. If the block needs to be encrypted, both the data encryption processor (DEP) 306 and the DMAC 60 need to be initialized. The block will be read from memory in eight byte segments written into the DEP. The DEP will encrypt each segment and inform the DMAC 60 when it is ready. Another channel will then read the segment from the DEP and write it back to RAM. This operation proceeds through the entire block.

After onboard UPB processing is complete, the data will be transferred to the network. In the case of the high speed network (FIG. 8), the first event is to initialize the PBUS DMAC 402. The DMAC reads RAM and writes the data to the MPCC 400. The MPCC has a small first-in first-out storage which buffers data. When this storage is full, the MPCC will not request any more data from the DMAC 402 until after a byte has been transferred to the network. Then, a new DMAC request will be generated for the next byte. The DMAC 402 and MPCC 400 operate in this alternating manner until the data block has been transferred to the network. When the transfers have been completed, an interrupt will be sent to the microprocessor 50.

The foregoing description illustrates an operational flow of a data block through the UPB. The architecture of UPB controller in accordance with the present invention allows for concurrent traffic on each of the buses. This capability enhances the aggregate throughput of the controller. Since network traffic is seldom synchronized, the multiple bus architecture allows traffic on multiple blocks in each direction to proceed concurrently. It is possible for all four buses to be in operation at the same time. For example, the PBUS can be occupied by the DMAC 402 transferring a byte from the MPCC 400 to RAM in a single address mode, the CBUS occupied by the microprocessor 60 executing an instruction read from EPROM 52A, the DBUS DMAC 60 writing a byte into the DEP in a dual address mode, and a UNIBUS interrupt occuring with the use of the UBUS. Although data traffic will only infrequently concurrently use all four buses in this manner, the multibus architecture in accordance with the present invention permits such operation in order to enhance aggregate throughput.

Although the four buses can operate independently, some operations will connect the buses into what amounts to a single bus. The most typical connections involve two buses via the interface modules 30, 32, and 34. For example, module 32 would typically connect the CBUS to the PBUS for microprocessor to PBUS peripheral reference. Similarly, interface module 30 would connect the CBUS to the DBUS for microprocessor 50 to DBUS peripheral reference. Additionally, module 34 would connect the DBUS to UBUS for DMAC transfers with the UNIBUS. In some situations however, three buses may be interconnected, as for example to enable a microprocessor reference of the UNIBUS. In this situation, the CBUS will be connected to the DBUS via module 30 which then connects to the UBUS via module 34.

In accordance with the preferred embodiment, only a single direct memory access controller is connected to each bus segment. Thus there is very little bus arbitration overhead or contention for the bus. Each of the DMA devices on each of the separate buses is the primary generator of that buses cycles. Since the microprocessor 50 is the central controlling element of the UPB, and is the only device that can cause cycles on all of the buses, its tendency is to cause bus segments to connect. For example, a reference to the MPCC (FIG. 8) causes the CBUS to connect to the PBUS. A reference to the checksum generator 307 (FIG. 6) causes the CBUS to connect to the DBUS. A reference to the UNIBUS causes the CBUS to connect to the DBUS which connects to the UBUS. Bus cycles by the other DMA devices cause the other buses to disconnect from the CBUS. For example, when the PBUS DMAC is transferring data from the MPCC to RAM, the PBUS is disconnected from the CBUS. The only bus cycle generated by a device other than the microprocessor that causes a bus connection, is when the DBUS DMAC references the UNIBUS. This causes the DBUS to connect to the UBUS.

From the foregoing, it should now be appreciated that an improved communication controller has been disclosed herein for facilitating bidirectional digital data transfers between a host processor and a communication network. As a consequence of the multiple independent bus architecture and central multiport RAM, the aggregate throughput of a communication controller in accordance with the invention is significantly enhanced as contrasted with prior art units.

Although a preferred embodiment of the invention has been described and illustrated herein, it is recognized that various modifications will occur to those skilled in the art and it is intended that the claims be interpreted to cover such.

APPENDIX A
Glossary of UPB Signal Names

| Signal | Definition |
|---|---|
| 12MCLK | 12 Megahertz Clock |
| 16MCLK | 16 Megahertz Clock |
| 3MCLK | 3 Megahertz Clock |
| 48MCLK | 48 Megahertz Clock |
| 4MCLK | 4 Megahertz Clock |
| 8MCLK | 8 Megahertz Clock |
| A00 | UNIBUS Address Bit 00 |
| A01 | UNIBUS Address Bit 01 |
| A02 | UNIBUS Address Bit 02 |
| A03 | UNIBUS Address Bit 03 |
| A04 | UNIBUS Address Bit 04 |
| A05 | UNIBUS Address Bit 05 |
| A06 | UNIBUS Address Bit 06 |
| A07 | UNIBUS Address Bit 07 |
| A08 | UNIBUS Address Bit 08 |
| A09 | UNIBUS Address Bit 09 |
| A10 | UNIBUS Address Bit 10 |
| A11 | UNIBUS Address Bit 11 |
| A12 | UNIBUS Address Bit 12 |
| A13 | UNIBUS Address Bit 13 |
| A14 | UNIBUS Address Bit 14 |
| A15 | UNIBUS Address Bit 15 |
| A16 | UNIBUS Address Bit 16 |
| A17 | UNIBUS Address Bit 17 |
| AUTOIA7 | Autovector Interrupt Acknowledge Level 7 |
| BBSY | UNIBUS Bus Busy |
| BBSYI | UNIBUS Bus Busy In |
| BBSYO | UNIBUS Bus Busy Out |
| BG4I | UNIBUS Bus Grant 4 In |
| BG4O | UNIBUS Bus Grant 4 Out |
| BG5I | UNIBUS Bus Grant 5 In |
| BG5O | UNIBUS Bus Grant 5 Out |
| BG6I | UNIBUS Bus Grant 6 In |
| BG6O | UNIBUS Bus Grant 6 Out |
| BG7I | UNIBUS Bus Grant 7 In |
| BG7O | UNIBUS Bus Grant 7 Out |
| BGI | UNIBUS Bus Grant In |
| BGO | UNIBUS Bus Grant Out |
| BGXDLY | UNIBUS Bus Grant "X" Delayed |
| BGXIN | UNIBUS Bus Grant "X" In |
| BGXOUT | UNIBUS Bus Grant "X" Out |
| BGXREC | UNIBUS Bus Grant "X" Received |
| BR4 | UNIBUS Bus Request 4 |
| BR5 | UNIBUS Bus Request 5 |
| BR6 | UNIBUS Bus Request 6 |
| BR7 | UNIBUS Bus Request 7 |
| BRX | UNIBUS Bus Request "X" |
| BRXOUT | UNIBUS Bus Request "X" Out |
| BTOCLK | Bus Timeout Clock |
| BTOEN | Bus Timeout Enable |
| C0 | UNIBUS Control Bit 0 |
| C0I | UNIBUS Control Bit 0 In |
| C0O | UNIBUS Control Bit 0 Output |
| C1 | UNIBUS Control Bit 1 |
| C1I | UNIBUS Control Bit 1 In |
| C1O | UNIBUS Control Bit 1 Output |
| C2DCNEN | CBUS To DBUS Control Enable |
| C2DEN | CBUS to DBUS Enable |
| C2PCNEN | CBUS To PBUS Control Enable |
| C2PEN | CBUS to PBUS Enable |
| CA01 | CBUS Address Bit 01 |
| CA02 | CBUS Address Bit 02 |
| CA03 | CBUS Address Bit 03 |
| CA04 | CBUS Address Bit 04 |
| CA05 | CBUS Address Bit 05 |
| CA06 | CBUS Address Bit 06 |
| CA07 | CBUS Address Bit 07 |
| CA08 | CBUS Address Bit 08 |
| CA09 | CBUS Address Bit 09 |
| CA10 | CBUS Address Bit 10 |
| CA11 | CBUS Address Bit 11 |
| CA12 | CBUS Address Bit 12 |
| CA13 | CBUS Address Bit 13 |
| CA14 | CBUS Address Bit 14 |
| CA15 | CBUS Address Bit 15 |
| CA16 | CBUS Address Bit 16 |
| CA17 | CBUS Address Bit 17 |
| CA18 | CBUS Address Bit 18 |
| CA19 | CBUS Address Bit 19 |
| CA20 | CBUS Address Bit 20 |
| CA21 | CBUS Address Bit 21 |
| CA22 | CBUS Address Bit 22 |
| CA23 | CBUS Address Bit 23 |
| CAS | Column Address Strobe |
| CBERR | CBUS Bus Error |
| CBIACK | CBUS Interrupt Acknowledge |
| CBUSAS | CBUS Address Strobe |
| CBUSTO | CBUS Timeout |
| CD00 | CBUS Data Bit 00 |
| CD01 | CBUS Data Bit 01 |
| CD02 | CBUS Data Bit 02 |
| CD03 | CBUS Data Bit 03 |
| CD04 | CBUS Data Bit 04 |
| CD05 | CBUS Data Bit 05 |
| CD06 | CBUS Data Bit 06 |
| CD07 | CBUS Data Bit 07 |
| CD08 | CBUS Data Bit 08 |
| CD09 | CBUS Data Bit 09 |
| CD10 | CBUS Data Bit 10 |
| CD11 | CBUS Data Bit 11 |
| CD12 | CBUS Data Bit 12 |
| CD13 | CBUS Data Bit 13 |
| CD14 | CBUS Data Bit 14 |
| CD15 | CBUS Data Bit 15 |
| CDTACK | CBUS Data Transfer Acknowledge |
| CE | CBUS 6800 Enable |
| CENSTB | Clock Enable Strobe |
| CFC0 | CBUS Function Code 0 |
| CFC1 | CBUS Function Code 1 |
| CFC2 | CBUS Function Code 2 |
| CIPL0 | CBUS Interrupt Priority Level 0 |
| CIPL1 | CBUS Interrupt Priority Level 1 |
| CIPL2 | CBUS Interrupt Priority Level 2 |
| CIRQA | CBUS Interrupt Request A |
| CIRQB | CBUS Interrupt Request B |
| CK00 | Checksum Generator Bit 00 |
| CK01 | Checksum Generator Bit 01 |
| CK02 | Checksum Generator Bit 02 |
| CK03 | Checksum Generator Bit 03 |

APPENDIX A
Glossary of UPB Signal Names

| Signal | Definition |
| --- | --- |
| CK04 | Checksum Generator Bit 04 |
| CK05 | Checksum Generator Bit 05 |
| CK06 | Checksum Generator Bit 06 |
| CK07 | Checksum Generator Bit 07 |
| CK08 | Checksum Generator Bit 08 |
| CK09 | Checksum Generator Bit 09 |
| CK10 | Checksum Generator Bit 10 |
| CK11 | Checksum Generator Bit 11 |
| CK12 | Checksum Generator Bit 12 |
| CK13 | Checksum Generator Bit 13 |
| CK14 | Checksum Generator Bit 14 |
| CK15 | Checksum Generator Bit 15 |
| CKSMCLR | Checksum Generator Clear |
| CKSMOE | Checksum Generator Output Enable |
| CKSMSTB | Checksum Generator Strobe |
| CLDS | CBUS Upper Data Strobe |
| CPUVP | CPU Voltage Pullup |
| CRAMSEL | CBUS RAM Select |
| CRW | CBUS Read+/Write− |
| CRY03 | Checksum Carry Bit 03 |
| CRY07 | Checksum Carry Bit 07 |
| CRY11 | Checksum Carry Bit 11 |
| CRY15 | Checksum Carry Bit 15 |
| CSA | Clear to Send, A Line |
| CSB | Clear to Send, B Line |
| CTS | Clear to Send |
| CUBYTE | CPU-UNIBUS Byte Control Bit |
| CUDS | CBUS Upper Data Strobe |
| CVMA | CBUS Valid Memory Address |
| CVPA | CBUS Valid Peripheral Address |
| D00 | UNIBUS Data Bit 00 |
| D01 | UNIBUS Data Bit 01 |
| D02 | UNIBUS Data Bit 02 |
| D03 | UNIBUS Data Bit 03 |
| D04 | UNIBUS Data Bit 04 |
| D05 | UNIBUS Data Bit 05 |
| D06 | UNIBUS Data Bit 06 |
| D07 | UNIBUS Data Bit 07 |
| D08 | UNIBUS Data Bit 08 |
| D09 | UNIBUS Data Bit 09 |
| D10 | UNIBUS Data Bit 10 |
| D11 | UNIBUS Data Bit 11 |
| D12 | UNIBUS Data Bit 12 |
| D13 | UNIBUS Data Bit 13 |
| D14 | UNIBUS Data Bit 14 |
| D15 | UNIBUS Data Bit 15 |
| DA01 | DBUS Address Bit 01 |
| DA02 | DBUS Address Bit 02 |
| DA03 | DBUS Address Bit 03 |
| DA04 | DBUS Address Bit 04 |
| DA05 | DBUS Address Bit 05 |
| DA06 | DBUS Address Bit 06 |
| DA07 | DBUS Address Bit 07 |
| DA08 | DBUS Address Bit 08 |
| DA08D00 | DBUS DMA Multiplexed Address Bit 08/ Data Bit 00 |
| DA09 | DBUS Address Bit 09 |
| DA09D01 | DBUS DMA Multiplexed Address Bit 09/ Data Bit 01 |
| DA10 | DBUS Address Bit 10 |
| DA10D02 | DBUS DMA Multiplexed Address Bit 10/ Data Bit 02 |
| DA11 | DBUS Address Bit 11 |
| DA11D03 | DBUS DMA Multiplexed Address Bit 11/ Data Bit 03 |
| DA12 | DBUS Address Bit 12 |
| DA12D04 | DBUS DMA Multiplexed Address Bit 12/ Data Bit 04 |
| DA13 | DBUS Address Bit 13 |
| DA13D05 | DBUS DMA Multiplexed Address Bit 13/ Data Bit 05 |
| DA14 | DBUS Address Bit 14 |
| DA14D06 | DBUS DMA Multiplexed Address Bit 14/ Data Bit 06 |
| DA15 | DBUS Address Bit 15 |
| DA15D07 | DBUS DMA Multiplexed Address Bit 15/ Data Bit 07 |
| DA16 | DBUS Address Bit 16 |
| DA16D08 | DBUS DMA Multiplexed Address Bit 16/ Data Bit 08 |
| DA17 | DBUS Address Bit 17 |
| DA17D09 | DBUS DMA Multiplexed Address Bit 17/ Data Bit 09 |
| DA18 | DBUS Address Bit 18 |
| DA18D10 | DBUS DMA Multiplexed Address Bit 18/ Data Bit 10 |
| DA19 | DBUS Address Bit 19 |
| DA19D11 | DBUS DMA Multiplexed Address Bit 19/ Data Bit 11 |
| DA20 | DBUS Address Bit 20 |
| DA20D12 | DBUS DMA Multiplexed Address Bit 20/ Data Bit 12 |
| DA21 | DBUS Address Bit 21 |
| DA21D13 | DBUS DMA Multiplexed Address Bit 21/ Data Bit 13 |
| DA22 | DBUS Address Bit 22 |
| DA22D14 | DBUS DMA Multiplexed Address Bit 22/ Data Bit 14 |
| DA23 | DBUS Address Bit 23 |
| DA23D15 | DBUS DMA Multiplexed Address Bit 23/ Data Bit 15 |
| DBEC0 | DBUS DMAC Bus Error Code 0 |
| DBEC1 | DBUS DMAC Bus Error Code 1 |
| DBEC2 | DBUS DMAC Bus Error Code 2 |
| DBG | DBUS Bus Grant |
| DBGACK | DBUS Bus Grant Acknowledge |
| DBIACK | DBUS Interrupt Acknowledge |
| DBR | DBUS Bus Request |
| DBUSAS | DBUS Address Strobe |
| DBUSSEL | DBUS Select |
| DBUSTO | DBUS Timeout |
| DCD | Data Carrier Detect |
| DCPAD1 | DCP Multiplexed Address/Data Bit 1 |
| DCPAD2 | DCP Multiplexed Address/Data Bit 2 |
| DCPAS | DCP Address Strobe |
| DCPDS | DCP Data Strobe |
| DCPDT | DCP Dtack |
| DCPIRDY | DCP Input Channel Ready |
| DCPORDY | DCP Output Channel Ready |
| DD00 | DBUS Data Bit 00 |
| DD01 | DBUS Data Bit 01 |
| DD02 | DBUS Data Bit 02 |
| DD03 | DBUS Data Bit 03 |
| DD04 | DBUS Data Bit 04 |
| DD05 | DBUS Data Bit 05 |
| DD06 | DBUS Data Bit 06 |
| DD07 | DBUS Data Bit 07 |
| DD08 | DBUS Data Bit 08 |
| DD09 | DBUS Data Bit 09 |
| DD10 | DBUS Data Bit 10 |
| DD11 | DBUS Data Bit 11 |
| DD12 | DBUS Data Bit 12 |
| DD13 | DBUS Data Bit 13 |
| DD14 | DBUS Data Bit 14 |
| DD15 | DBUS Data Bit 15 |
| DDDBEN | DBUS DMA Data Bus Enable |
| DDDDIR | DBUS DMA Data Direction |
| DDMAIAK | DBUS DMA Interrupt Acknowledge |
| DDMAIRQ | DBUS DMA Interrupt Request |
| DDMASEL | DBUS DMA Chip Select |
| DDOWN | DBUS DMA Owns DBUS |
| DDTACK | DBUS Data Transfer Acknowledge |
| DDUAS | DBUS DMA Upper Address Strobe |
| DIPSW8 | DIP Switch Bit 8 |
| DIPSW9 | DIP Switch Bit 9 |
| DIPSW10 | DIP Switch Bit 10 |
| DIPSW11 | DIP Switch Bit 11 |
| DIPSW12 | DIP Switch Bit 12 |
| DIPSW13 | DIP Switch Bit 13 |
| DIPSW14 | DIP Switch Bit 14 |
| DIPSW15 | DIP Switch Bit 15 |
| DIPSWOE | DIP Switch Output Enable |
| DLDS | DBUS Upper Data Strobe |
| DMA | Data Mode, Line A |
| DMAIACK | DMA Input Acknowledge |
| DMAIREQ | DMA Input Channel Request |

APPENDIX A
Glossary of UPB Signal Names

| Signal | Definition |
|---|---|
| DMAOACK | DMA Output Acknowledge |
| DMAOREQ | DMA Output Channel Request |
| DMB | Data Mode, Line B |
| DONE | DMAC Done |
| DPERSEL | DBUS Peripheral Select |
| DRAMA0 | DRAM Address Bit 0 |
| DRAMA0Q | DRAM Address Bit 0, Controller Q-Output |
| DRAMA1 | DRAM Address Bit 1 |
| DRAMA1Q | DRAM Address Bit 1, Controller Q-Output |
| DRAMA2 | DRAM Address Bit 2 |
| DRAMA2Q | DRAM Address Bit 2, Controller Q-Output |
| DRAMA3 | DRAM Address Bit 3 |
| DRAMA3Q | DRAM Address Bit 3, Controller Q-Output |
| DRAMA4 | DRAM Address Bit 4 |
| DRAMA4Q | DRAM Address Bit 4, Controller Q-Output |
| DRAMA5 | DRAM Address Bit 5 |
| DRAMA5Q | DRAM Address Bit 5, Controller Q-Output |
| DRAMA6 | DRAM Address Bit 6 |
| DRAMA6Q | DRAM Address Bit 6, Controller Q-Output |
| DRAMA7 | DRAM Address Bit 7 |
| DRAMA7Q | DRAM Address Bit 7, Controller Q-Output |
| DRAMA8 | DRAM Address Bit 8 |
| DRAMA8Q | DRAM Address Bit 8, Controller Q-Output |
| DRAMSEL | RAM Select via DBUS |
| DRAMWE | Dynamic RAM Write Enable |
| DRAMWEN | Dynamic RAM Write Enable |
| DRW | DBUS Read+/Write− |
| DSR | Data Set Ready |
| DTR | Data Terminal Ready |
| DUBYTE | DMA-UNIBUS Byte Control Bit |
| DUDS | DBUS Upper Data Strobe |
| EEPRLDS | EEPROM Lower Data Strobe |
| EEPRSEL | EEPROM Select |
| EEPRUDS | EEPROM Upper Data Strobe |
| EPJP01 | EPROM Jumper for Pin 1 |
| EPJP27 | EPROM Jumper for Pin 27 |
| EXTDR | External Diode-Resistor |
| EXTRC | External Resistor-Capacitor |
| EXTRC2 | External RC #2 |
| EXTRES | External Reset |
| HALT | CPU Halt |
| INIT | UNIBUS Initialization |
| INTR | UNIBUS Interrupt |
| INTRO | UNIBUS Interrupt Out |
| IREQ | Input Request |
| IREQCLR | Input Request Clear |
| LCAS | Lower Column Address Strobe |
| LCASB | Lower Column Address Strobe Buffered |
| LDSWSEL | LED and Switch Select |
| LED0 | LED Register Bit 0 |
| LED1 | LED Register Bit 1 |
| LED2 | LED Register Bit 2 |
| LED3 | LED Register Bit 3 |
| LED4 | LED Register Bit 4 |
| LED5 | LED Register Bit 5 |
| LED6 | LED Register Bit 6 |
| LED7 | LED Register Bit 7 |
| LEDRLD | LED Register Load |
| LEGALFC | Legal Function Code |
| LM0SEL | Latched Memory Port 0 Select |
| LM1SEL | Latched Memory Port 1 Select |
| LM2SEL | Latched Memory Port 2 Select |
| LM3SEL | Latched Memory Port 3 Select |
| LPAR | Lower Parity |
| LPAROUT | Lower Parity Bit Output |
| LROMSEL | Lower EPROM Select |
| MA01 | Memory Address Bit 01 |
| MA02 | Memory Address Bit 02 |
| MA03 | Memory Address Bit 03 |
| MA04 | Memory Address Bit 04 |
| MA05 | Memory Address Bit 05 |
| MA06 | Memory Address Bit 06 |
| MA07 | Memory Address Bit 07 |
| MA08 | Memory Address Bit 08 |
| MA09 | Memory Address Bit 09 |
| MA10 | Memory Address Bit 10 |
| MA11 | Memory Address Bit 11 |
| MA12 | Memory Address Bit 12 |
| MA13 | Memory Address Bit 13 |
| MA14 | Memory Address Bit 14 |
| MA15 | Memory Address Bit 15 |
| MA16 | Memory Address Bit 16 |
| MA17 | Memory Address Bit 17 |
| MA18 | Memory Address Bit 18 |
| MA19 | Memory Address Bit 19 |
| MAINT | Maintenance Board Installed |
| MBIACK | Maintenance Board Interrupt Acknowledge |
| MBDIRQ | Maintenance Board Interrupt Request |
| MBDSEL | Maintenance Board Select |
| MCYCD1 | Memory Cycle Delay 1 |
| MCYCD2 | Memory Cycle Delay 2 |
| MD00 | Memory Data Bit 00 |
| MD01 | Memory Data Bit 01 |
| MD02 | Memory Data Bit 02 |
| MD03 | Memory Data Bit 03 |
| MD04 | Memory Data Bit 04 |
| MD05 | Memory Data Bit 05 |
| MD06 | Memory Data Bit 06 |
| MD07 | Memory Data Bit 07 |
| MD08 | Memory Data Bit 08 |
| MD09 | Memory Data Bit 09 |
| MD10 | Memory Data Bit 10 |
| MD11 | Memory Data Bit 11 |
| MD12 | Memory Data Bit 12 |
| MD13 | Memory Data Bit 13 |
| MD14 | Memory Data Bit 14 |
| MD15 | Memory Data Bit 15 |
| MDTACK | Memory DTACK |
| MEMCYC | Memory Cycle |
| MEMEN0 | Memory Enable Port 0 |
| MEMEN1 | Memory Enable Port 1 |
| MEMEN2 | Memory Enable Port 2 |
| MEMEN3 | Memory Enable Port 3 |
| MEMMAP | Memory Map Bit |
| MEMSIZE | Memory (RAM) Size |
| MFPIAK | MFP Interrupt Acknowledge |
| MFPIRQ | MFP Interrupt Request |
| MFPSEL | 68901 Multi-Function Peripheral Select |
| MFPTCO | MFP Timer C Output |
| MFPTDO | MFP Timer D Output |
| MLDS | Memory Upper Data Strobe |
| MPCCD00 | MPCC Data Bit 00 |
| MPCCD01 | MPCC Data Bit 01 |
| MPCCD02 | MPCC Data Bit 02 |
| MPCCD03 | MPCC Data Bit 03 |
| MPCCD04 | MPCC Data Bit 04 |
| MPCCD05 | MPCC Data Bit 05 |
| MPCCD06 | MPCC Data Bit 06 |
| MPCCD07 | MPCC Data Bit 07 |
| MPCCIAK | MPCC Interrupt Acknowledge |
| MPCCIRQ | MPCC Interrupt Request |
| MPCCSEL | MPCC Chip Select |
| MPDIR | MPCC Data Direction |
| MPLDEN | MPCC Lower Data Byte Enable |
| MPUDEN | MPCC Upper Data Byte Enable |
| MRESET | Maintenance Board Reset |
| MRW | Memory Read+/Write− |
| MSYN | UNIBUS Master Sync |
| MSYNI | UNIBUS Master Sync In |
| MSYNO | UNIBUS Master Sync Out |
| MUDS | Memory Upper Data Strobe |
| NMI | Non-Maskable Interrupt |
| NMIQ | Non-Maskable Interrupt, Q-Output |
| NMIQACK | Non-Maskable Interrupt Acknowledge |
| NMIQCLR | Non-Maskable Interrupt Clear |
| NMIQRES | Non-Maskable Interrupt Reset |
| NPGDLY | UNIBUS Non-Processor Grant Delayed |
| NPGI | Non-Processor Grant In |
| NPGIN | UNIBUS Non-Processor Grant In |
| NPGO | Non-Processor Grant Out |
| NPGOUT | UNIBUS Non-Processor Grant Out |
| NPGREC | Non-Processor Grant Received |
| NPR | UNIBUS Non-Processor Request |
| NPROUT | Non-Processor Request Out |
| OSRSTB | One Shot Reset Strobe |
| PA01 | PBUS Address Bit 01 |

-continued
APPENDIX A
Glossary of UPB Signal Names

| Signal | Definition |
|---|---|
| PA02 | PBUS Address Bit 02 |
| PA03 | PBUS Address Bit 03 |
| PA04 | PBUS Address Bit 04 |
| PA05 | PBUS Address Bit 05 |
| PA06 | PBUS Address Bit 06 |
| PA07 | PBUS Address Bit 07 |
| PA08 | PBUS Address Bit 08 |
| PA08D00 | PBUS DMAC Address Bit 08, Data Bit 00 |
| PA09 | PBUS Address Bit 09 |
| PA09D01 | PBUS DMAC Address Bit 09, Data Bit 01 |
| PA10 | PBUS Address Bit 10 |
| PA10D02 | PBUS DMAC Address Bit 10, Data Bit 02 |
| PA11 | PBUS Address Bit 11 |
| PA11D03 | PBUS DMAC Address Bit 11, Data Bit 03 |
| PA12 | PBUS Address Bit 12 |
| PA12D04 | PBUS DMAC Address Bit 12, Data Bit 04 |
| PA13 | PBUS Address Bit 13 |
| PA13D05 | PBUS DMAC Address Bit 13, Data Bit 05 |
| PA14 | PBUS Address Bit 14 |
| PA14D06 | PBUS DMAC Address Bit 14, Data Bit 06 |
| PA15 | PBUS Address Bit 15 |
| PA15D07 | PBUS DMAC Address Bit 15, Data Bit 07 |
| PA16 | PBUS Address Bit 16 |
| PA16D08 | PBUS DMAC Address Bit 16, Data Bit 08 |
| PA17 | PBUS Address Bit 17 |
| PA17D09 | PBUS DMAC Address Bit 17, Data Bit 09 |
| PA18 | PBUS Address Bit 18 |
| PA18D10 | PBUS DMAC Address Bit 18, Data Bit 10 |
| PA19 | PBUS Address Bit 19 |
| PA19D11 | PBUS DMAC Address Bit 19, Data Bit 11 |
| PA20 | PBUS Address Bit 20 |
| PA20D12 | PBUS DMAC Address Bit 20, Data Bit 12 |
| PA21 | PBUS Address Bit 21 |
| PA21D13 | PBUS DMAC Address Bit 21, Data Bit 13 |
| PA22 | PBUS Address Bit 22 |
| PA22D14 | PBUS DMAC Address Bit 22, Data Bit 14 |
| PA23 | PBUS Address Bit 23 |
| PA23D15 | PBUS DMAC Address Bit 23, Data Bit 15 |
| PARERR | Parity Error |
| PARODD | Parity Odd |
| PBEC0 | PBUS DMAC Bus Error Code 0 |
| PBEC1 | PBUS DMAC Bus Error Code 1 |
| PBEC2 | PBUS DMAC Bus Error Code 2 |
| PBG | PBUS Bus Grant |
| PBGACK | PBUS Bus Grant Acknowledge |
| PBR | PBUS Bus Request |
| PBUSAS | PBUS Address Strobe |
| PBUSIACK | PBUS Interrupt Acknowledge |
| PBUSIRQ | PBUS Interrupt Request |
| PBUSSEL | PBUS Select |
| PBUSTO | PBUS Timeout |
| PD00 | PBUS Data Bit 00 |
| PD01 | PBUS Data Bit 01 |
| PD02 | PBUS Data Bit 02 |
| PD03 | PBUS Data Bit 03 |
| PD04 | PBUS Data Bit 04 |
| PD05 | PBUS Data Bit 05 |
| PD06 | PBUS Data Bit 06 |
| PD07 | PBUS Data Bit 07 |
| PD08 | PBUS Data Bit 08 |
| PD09 | PBUS Data Bit 09 |
| PD10 | PBUS Data Bit 10 |
| PD11 | PBUS Data Bit 11 |
| PD12 | PBUS Data Bit 12 |
| PD13 | PBUS Data Bit 13 |
| PD14 | PBUS Data Bit 14 |
| PD15 | PBUS Data Bit 15 |
| PDDACK0 | PBUS DMAC Acknowledge Channel 0 |
| PDDACK1 | PBUS DMAC Acknowledge Channel 1 |
| PDDACK2 | PBUS DMAC Acknowledge Channel 2 |
| PDDACK3 | PBUS DMAC Acknowledge Channel 3 |
| PDDACK | PBUS DMAC Acknowledge |
| PDDBEN | PBUS DMAC Bus Enable |
| PDDDIR | PBUS DMAC Data Direction |
| PDDONE | PBUS DMAC Done |
| PDETEN | Parity Detect Enable |
| PDHIBYT | PBUS DMAC High Byte |
| PDMAIAD | PBUS DMAC Interrupt Acknowledge |

-continued
APPENDIX A
Glossary of UPB Signal Names

| Signal | Definition |
|---|---|
| PDMAIRQ | PBUS DMAC Interrupt Request |
| PDMASEL | PBUS DMA Chip Select |
| PDOWN | PBUS DMAC Owns Bus |
| PDREQ0 | PBUS DMAC Channel 0 Request |
| PDREQ1 | PBUS DMAC Channel 1 Request |
| PDREQ2 | PBUS DMAC Channel 2 Request |
| PDREQ3 | PBUS DMAC Channel 3 Request |
| PDTACK | PBUS Data Transfer Acknowledge |
| PDTC | PBUS DMAC Data Transfer Complete |
| PDUAS | PBUS DMAC Upper Address Strobe |
| PLDS | PBUS Lower Data Strobe |
| PRAMSEL | RAM Select via PBUS |
| PRW | PBUS Read+/Write− |
| PUDS | PBUS Upper Data Strobe |
| PURESET | Power Up Reset |
| RAS0 | Row Address Strobe 0 |
| RAS0Q | Row Address Strobe 0, 8409 Q-Output |
| RAS1 | Row Address Strobe 1 |
| RAS1Q | Row Address Strobe 1, 8409 Q-Output |
| RASIN | Row Address Strobe Input |
| RDA | Receive Data, Line A |
| RDB | Receive Data, Line B |
| REFRQ | Refresh Request |
| REFRQD | Refresh Request Delayed |
| REFRSH | Refresh |
| RESET | Reset |
| RESTART | Restart |
| RFSHCLK | Refresh Clock |
| RRA | Receiver Ready, Line A |
| RRB | Receiver Ready, Line B |
| RSA | Request to Send, Line A |
| RSB | Request to Send, Line A |
| RTA | Receive Timing, Line A |
| RTB | Receive Timing, Line B |
| RTS | Request to Send |
| RXC | Receive Clock |
| RXCEN | Receive Clock Enable |
| RXD | Receive Data |
| RXREQ | Receive Request |
| RXREQ0Q | Receive Request Channel 0, Q-Output |
| SACK | UNIBUS Selection Acknowledge |
| SACKO | UNIBUS Selection Acknowledge Out |
| SCRLE | System Control Register Load Enable |
| SCROE | System Control Register Output Enable |
| SCRSEL | System Configuration Register Select |
| SDA | Send Data, Line A |
| SDB | Send Data, Line B |
| SRCAPA1 | Slew Rate Capacitor A, Driver 1 |
| SRCAPA2 | Slew Rate Capacitor A, Driver 2 |
| SRCAPB1 | Slew Rate Capacitor B, Driver 1 |
| SRCAPB2 | Slew Rate Capacitor B, Driver 2 |
| SRCAPC1 | Slew Rate Capacitor C, Driver 1 |
| SRCAPC2 | Slew Rate Capacitor C, Driver 2 |
| SRCAPD1 | Slew Rate Capacitor D, Driver 1 |
| SRCAPD2 | Slew Rate Capacitor D, Driver 2 |
| SSYN | UNIBUS Slave Sync |
| SSYNI | UNIBUS Slave Sync In |
| SSYNO | UNIBUS Slave Sync Out |
| STA | Send Timing, Line A |
| STB | Send Timing, Line B |
| TIMRES | Timed Reset |
| TRA | Terminal Ready, Line A |
| TRB | Terminal Ready, Line B |
| TTA | Terminal Timing, Line A |
| TTB | Terminal Timing, Line B |
| TXC | Transmit Clock |
| TXCEN | Transmit Clock Enable |
| TXD | Transmit Data |
| TXDQ | Transmit Data Q-Output |
| TXREQ | Transmit Request |
| TXREQ2Q | Transmit Request Channel 2 Q-Output |
| UA00O | UNIBUS Address Bit 00 Output |
| UA00 | UBUS Address Bit 00 |
| UA01 | UBUS Address Bit 01 |
| UA02 | UBUS Address Bit 02 |
| UA03 | UBUS Address Bit 03 |
| UA04 | UBUS Address Bit 04 |
| UA05 | UBUS Address Bit 05 |

APPENDIX A
Glossary of UPB Signal Names

| Signal | Definition |
| --- | --- |
| UA06 | UBUS Address Bit 06 |
| UA07 | UBUS Address Bit 07 |
| UA08 | UBUS Address Bit 08 |
| UA09 | UBUS Address Bit 09 |
| UA10 | UBUS Address Bit 10 |
| UA11 | UBUS Address Bit 11 |
| UA12 | UBUS Address Bit 12 |
| UA13 | UBUS Address Bit 13 |
| UA14 | UBUS Address Bit 14 |
| UA15 | UBUS Address Bit 15 |
| UA16 | UBUS Address Bit 16 |
| UA17 | UBUS Address Bit 17 |
| UACMP | UNIBUS Slave Address Compare |
| UAEN | UNIBUS Address Driver Enable |
| UBA05 | UNIBUS Base Address Bit 05 |
| UBA06 | UNIBUS Base Address Bit 06 |
| UBA07 | UNIBUS Base Address Bit 07 |
| UBA08 | UNIBUS Base Address Bit 08 |
| UBA09 | UNIBUS Base Address Bit 09 |
| UBA10 | UNIBUS Base Address Bit 10 |
| UBA11 | UNIBUS Base Address Bit 11 |
| UBA12 | UNIBUS Base Address Bit 12 |
| UCAS | Upper Column Address Strobe |
| UCASB | Upper Column Address Strobe Buffered |
| UCSR07 | UNIBUS CSR Bit 07 |
| UCSR15 | UNIBUS CSR Bit 15 |
| UCSRCLE | UNIBUS CSR CBUS Load Enable |
| UCSRCOE | UNIBUS CSR CBUS Output Enable |
| UCSRCSL | UNIBUS CSR CBUS Select |
| UCSRULD | UNIBUS CSR Upper Load |
| UCSRUOE | UNIBUS CSR Upper Output Enable |
| UCSRUSL | UNIBUS CSR Upper Select |
| UD00 | UBUS Data Bit 00 |
| UD01 | UBUS Data Bit 01 |
| UD02 | UBUS Data Bit 02 |
| UD03 | UBUS Data Bit 03 |
| UD04 | UBUS Data Bit 04 |
| UD05 | UBUS Data Bit 05 |
| UD06 | UBUS Data Bit 06 |
| UD07 | UBUS Data Bit 07 |
| UD08 | UBUS Data Bit 08 |
| UD09 | UBUS Data Bit 09 |
| UD10 | UBUS Data Bit 10 |
| UD11 | UBUS Data Bit 11 |
| UD12 | UBUS Data Bit 12 |
| UD13 | UBUS Data Bit 13 |
| UD14 | UBUS Data Bit 14 |
| UD15 | UBUS Data Bit 15 |
| UDACK | UNIBUS NPR Master |
| UDEN | UNIBUS Data Enable |
| UDLD | UNIBUS Data Load |
| UDMAEN | UNIBUS DMA Enable |
| UDTACK | UBUS Data Transfer Acknowledge |
| UIACK | UNIBUS Interrupt Master |
| UIENA | UNIBUS Interrupt A Enable |
| UIENB | UNIBUS Interrupt B Enable |
| UINITI | UNIBUS Initialization In |
| UINTA | UNIBUS Interrupt A Active |
| UINTRQA | UNIBUS Interrupt Request A |
| UINTRQB | UNIBUS Interrupt Request B |
| UIREQ | UNIBUS Interrupt Request |
| UIV03 | UNIBUS Vector Bit 03 |
| UIV04 | UNIBUS Vector Bit 04 |
| UIV05 | UNIBUS Vector Bit 05 |
| UIV06 | UNIBUS Vector Bit 06 |
| UIV07 | UNIBUS Vector Bit 07 |
| UIV08 | UNIBUS Vector Bit 08 |
| UIV09 | UNIBUS Vector Bit 09 |
| UIV10 | UNIBUS Vector Bit 10 |
| UIVRLD | UNIBUS Interrupt Vector Register Load |
| UIVROE | UNIBUS Interrupt Vector Register Output Enable |
| ULDS | UBUS Upper Data Strobe |
| UMACK | UNIBUS Master |
| UMAKD1 | UNIBUS Master Delay 1 |
| UMAKDLY | UNIBUS Master Acknowledge Delayed |
| UMBYTEN | UNIBUS Master Byte Mode Data Buffer Enable |
| UMDBEN | UNIBUS Master Data Bus Enable |
| UMLDRV | UNIBUS Master Load Drivers |
| UMWRDEN | UNIBUS Master Word Mode Data Buffer Enable |
| UNISEL | UNIBUS Select |
| UPAR | Upper Parity |
| UPARERR | Upper Parity Error |
| UPARIN | Upper Parity Bit Input |
| UPAROUT | Upper Parity Bit Output |
| URAMSEL | UBUS RAM Select |
| URESET | UNIBUS Module Reset |
| UROMSEL | Upper EPROM Select |
| URW | UBUS Read+/Write− |
| USDBEN | UNIBUS Slave Data Bus Enable |
| USDLY1 | UNIBUS Slave Delay 1 |
| USDTA | UNIBUS Slave Data Transfer Acknowledge |
| USLAVE | UNIBUS Slave |
| USLDRV | UNIBUS Slave Load Drivers |
| USLSEL | UNIBUS Slave Lower Select |
| USUSEL | UNIBUS Slave Upper Select |
| UUDS | UBUS Upper Data Strobe |
| UVCTSEL | UNIBYS Vector Register Select |

APPENDIX B

For the: MC68000L12 12.5MHz Microprocessor
  MC68450 Direct Memory Access Controller
  MC68561 Multi-Protocol Communication Controller
See the: Motorola Microprocessors Data Manual
  Motorola Semiconductor Products Inc.
  Austin TX 78721

For the: HD68450 Direct Memory Access Controller
See the: Microcomputer Data Book
  Hitachi America, Ltd.
  San Jose CA 95112

For the: AmZ8068 Data Ciphering Processor
See the: MOS Microprocessors and Peripherals Data Book
  Advanced Micro Devices
  Sunnyvale CA 94088

For the: MK68901 Multi-Function Peripheral
See the: Microcomputer Data Book
  United Tecnnologies MOSTEK
  Carrollton TX 75006

For the: R68561 Multi-Protocol Communication Controller
See the: R68000 Microcomputer System Product Description
  Rockwell International Corporation For the: UNIBUS interface
See the: DEC UNIBUS Specification
  and
  PDP-11 Bus Handbook (1983)
  Digital Equipment Corporation
  Maynard, MA For the: RS-422 Serial Interface
See the: Elelctrical Characteristics of Balanced Voltage
  Digital Interface Circuits
  EIA Standard RS-422
  Electric Industries Association
  Washington, D.C. 20006

Also See: The TTL Data Book (Vol. 1,2,3)
  Texas Instruments Incorporated
  Dallas, TX 75265

APPENDIX C #1

UPB Memory Map
This represents CBUS decoding

| Address | |
| --- | --- |
| F0 00 00 | |
| E0 00 00 | PBUS 68450 DMAC |
| D0 00 00 | DBUS 68450 DMAC |
| C0 00 00 | |

APPENDIX C #1-continued

UPB Memory Map

| Address | Contents |
|---|---|
| B0 00 00 | Control Registers |
| A0 00 00 | 68561 MPCC |
| 90 00 00 | Checksum Generator / 8068 DEP |
| 80 00 00 | 68901 MFP |
| 70 00 00 | Maintenance Board |
| 60 00 00 | (Ram via CBUS for diagnostic only) |
| 50 00 00 | UNIBUS |
| 40 00 00 | E PROM |
| 30 00 00 | EEPROM |
| 20 00 00 | (RAM via PBUS for diagnostics only) |
| 10 00 00 | (RAM via DBUS for diagnostics only) |
| 00 00 00 | RAM |

C-1

APPENDIX C #2

UPB Memory Map

This represents DBUS decoding

| Address | Contents |
|---|---|
| F0 00 00 – C0 00 00 | 68450 DMAC |
| B0 00 00 – 80 00 00 | DEP and Checksum Generator |
| 70 00 00 – 40 00 00 | UNIBUS |
| 30 00 00 – 00 00 00 | RAM |

C-2

APPENDIX C #3

UPB Memory Map

This represents PBUS decoding

APPENDIX C #3-continued

UPB Memory Map

| Address | Contents |
|---|---|
| F0 00 00 – C0 00 00 | 68450 DMAC |
| B0 00 00 – 80 00 00 | 68561 MPCC |
| 70 00 00 – 40 00 00 | |
| 30 00 00 – 00 00 00 | RAM |

C-3

We claim:

1. A communications controller useful for processing digital data supplied by a host processor and a communications network in accordance with defined protocal rules and for transferring the processed data to said network and processor, respectively, said controller comprising:

random access memory means including a memory array, memory bus means, and arbitration logic means;

microprocessor means operable to supply memory access instructions;

first bus segment means connecting said microprocessor means to said arbitration logic means;

second bus segment means for connecting said communications network to said arbitration logic means;

third bus segment means for connecting said host processor to said arbitration logic means;

each of said second and third bus segment means having a component means connected thereto for supplying memory access instructions;

said arbitration logic means including means responsive to memory access instructions supplied by said first, second, and third bus segment means for coupling a selected one of said bus segment means to said memory bus means for reading data from or writing data into said memory array; and program memory means storing said protocol rules coupled to said microprocessor means for causing said microprocessor means to selectively modify data written into said memory array by said second and third bus segment means.

2. The controller of claim 1 including first, second and third gate means respectively coupling said first, second, and third bus segment means to said memory bus means; and wherein said arbitration logic means selectively enables said first, second, and third gate means on an exclusive basis.

3. The controller of claim 1 wherein said microprocessor means and said component means connected to said second and third bus segment means are operable independently of each other whereby different operations on said first, second and third bus segment means can occur concurrently.

4. The controller of claim 1 including interface means selectively operable to couple said first and second bus segments; and wherein said microprocessor means is operable to selectively enable said interface means to couple said first bus segment to said second bus segment.

5. The controller of claim 1 further including:

direct memory access controller means for supplying memory access instructions;

fourth bus segment means connecting said direct memory access controller means to said arbitration logic means; and data modification means coupled to said direct memory access controller means.

6. The controller of claim 5 further including:

at least one selectively operable interface module for directly coupling one of said bus segment means to another of said bus segment means.

7. The controller of claim 5 further including a first interface module selectively operable to couple said first bus segment means to said second bus segment means;

a second interface module selectively operable to couple said first bus segment means to said fourth bus segment means; and a third interface module selectively operable to couple said third bus segment means to said fourth bus segment means.

8. A controller useful for bidirectionally transferring digital data between a communication channel and a host processor and for performing protocol processing on such data, said controller comprising:

random access memory means having first, second, and third input/output ports; and first, second, and third data transfer buses respectively coupled to said first, second, and third ports;

microprocessor means connected to said first bus operable to provide memory access instructions addressing particular locations in said memory means and defining whether data is to be read from or written into said addressed locations;

communication channel means connected to said second bus operable to provide memory access instructions addressing particular locations in said memory means and defining whether data is to be read from or written into said addressed locations;

host processor means connected to said third bus operable to provide memory access instructions addressing particular locations in said memory means and defining whether data is to be read from or written into said addressed locations;

said microprocessor means, communication channel means and host processor means being operable independently of one another; and arbitration logic means responsive to said memory access instructions for selectively coupling either said first bus or said second bus or said third bus to said memory means for reading data therefrom or writing data therein.

9. The controller of claim 8 including additional devices connected to at least one of said buses; and wherein at least one of said microprocessor means or said communication channel means or said host processor means is also operable to provide instructions addressing an additional device connected to the same bus; and means for transferring data along a bus between devices connected thereto while other data is concurrently being transferred along other buses between devices connected to the same bus and between such devices and said memory means.

10. The controller of claim 9 wherein one of said additional devices comprises a read only memory means connected to said first bus for storing protocol processing programs for use by said microprocessor means.

11. The controller of claim 9 wherein said random access memory has a forth input/output port; and further including a fourth data transfer bus coupled to said fourth port; and direct memory access control means connected to said fourth bus operable to provide memory access instructions addressing particular locations in said memory means and defining whether data is to be read from or written into said addressed locations.

12. The controller of claim 11 further including means for encrypting data connected to said direct memory access control means.

13. The controller of claim 11 further including means for generating a checksum connected to said direct memory access control means.

14. The controller of claim 8 including at least one interface module means for coupling one of said buses to another of said buses.

15. The controller of claim 11 including first interface module means selectively operable to couple said first and second buses;

second interface module means selectively operable to couple said first and fourth buses;

third interface module means selectively operable to couple said third and fourth buses.

16. The controller of claim 15 wherein said first interface module means is operable responsive to an instruction provided by said microprocessor means.

* * * * *